US012756081B2

(12) United States Patent
Adachi et al.

(10) Patent No.: US 12,756,081 B2
(45) Date of Patent: Oct. 6, 2026

(54) FILTER

(71) Applicant: SOSHIN ELECTRIC CO., LTD., Saku-City (JP)

(72) Inventors: Kazuya Adachi, Saku-City (JP); Kazuma Kosaka, Saku-City (JP)

(73) Assignee: Soshin Electric Co., LTD., Saku-City (JP)

( * ) Notice: Subject to any disclaimer, the term of this patent is extended or adjusted under 35 U.S.C. 154(b) by 54 days.

(21) Appl. No.: 18/876,860

(22) PCT Filed: Jun. 9, 2023

(86) PCT No.: PCT/JP2023/021601
§ 371 (c)(1),
(2) Date: Dec. 19, 2024

(87) PCT Pub. No.: WO2023/248837
PCT Pub. Date: Dec. 28, 2023

(65) Prior Publication Data

US 2026/0011899 A1 Jan. 8, 2026

(30) Foreign Application Priority Data

Jun. 24, 2022 (JP) ................................ 2022-101750

(51) Int. Cl.
*H01P 1/20* (2006.01)
*H01P 1/203* (2006.01)
*H01P 7/08* (2006.01)

(52) U.S. Cl.
CPC ............ *H01P 1/20327* (2013.01); *H01P 1/20* (2013.01); *H01P 7/08* (2013.01)

(58) Field of Classification Search
CPC ...... H01P 1/2056; H01P 1/205; H01P 1/2053; H01P 1/20; H01P 1/201; H01P 1/2002; H01P 1/202; H01P 7/04; H01P 7/00
USPC .......................................................... 333/202
See application file for complete search history.

(56) References Cited

U.S. PATENT DOCUMENTS

2010/0265015 A1 10/2010 Hoeft et al.
2021/0296748 A1 9/2021 Ogawa

FOREIGN PATENT DOCUMENTS

JP 2011-507312 A 3/2011
JP 2020-198482 A 12/2020
WO WO-2020026889 A1 * 2/2020 .......... H01P 1/20327

OTHER PUBLICATIONS

International Search Report and Written Opinion (Application No. PCT/JP2023/021601) dated Aug. 1, 2023 (8 pages).
Taiwanese Office Action (Application No. 112123117) dated May 10, 2024 (with English translation) (11 pages).

* cited by examiner

*Primary Examiner* — Stephen E. Jones
(74) *Attorney, Agent, or Firm* — Muncy, Geissler, Olds & Lowe, P.C.

(57) ABSTRACT

A filter comprises: a plurality of resonators, each of which is provided with a via electrode and capacitor electrodes; a first shielding conductor; and a first coupling capacitance electrode that faces the first shield conductor and is not connected to any of the plurality of resonators. The first coupling capacitance electrode is formed on a layer on which a first capacitor electrode is formed, and a part of the first coupling capacitance electrode is positioned between a second capacitor electrode and the first shield conductor.

4 Claims, 35 Drawing Sheets

FILTER

TECHNICAL FIELD

The present invention relates to a filter.

BACKGROUND ART

A resonator has been proposed having a strip line that faces toward a shielding conductive body that is formed on one main surface side of a dielectric substrate, and a via electrode having one end connected to a shielding conductive body formed on another main surface side of the dielectric substrate, and another end connected to the strip line (refer to JP 2020-198482 A).

SUMMARY OF THE INVENTION

There is a long awaited need for a technology that can realize more satisfactory filter characteristics.

The present invention has the object of solving the aforementioned problem.

An aspect of the present invention is characterized by a filter, including a dielectric substrate including a first main surface, and a second main surface positioned on an opposite side of the first main surface, a first shielding conductor formed on a first main surface side in the dielectric substrate, a second shielding conductor formed on a second main surface side in the dielectric substrate, a plurality of resonators each of which is equipped with a via electrode portion formed between the first shielding conductor and the second shielding conductor, and a capacitor electrode connected to one end of the via electrode portion, and a first coupling capacitance electrode that is not connected to any one of the plurality of resonators, and that is configured to face toward the first shielding conductor, wherein the first coupling capacitance electrode is formed in a layer in which a first capacitor electrode from among the plurality of capacitor electrodes is formed, a layer in which the first capacitor electrode is formed is positioned between a layer in which a second capacitor electrode from among the plurality of capacitor electrodes is formed, and a layer in which the first shielding conductor is formed, and a part of the first coupling capacitance electrode is positioned between the second capacitor electrode and the first shielding conductor.

According to the present invention, even in the case that a dimensional error or the like occurs when forming the capacitor electrodes, a deterioration of the filter characteristics can be suppressed.

DETAILED DESCRIPTION OF THE INVENTION

First Embodiment

Figure 1:
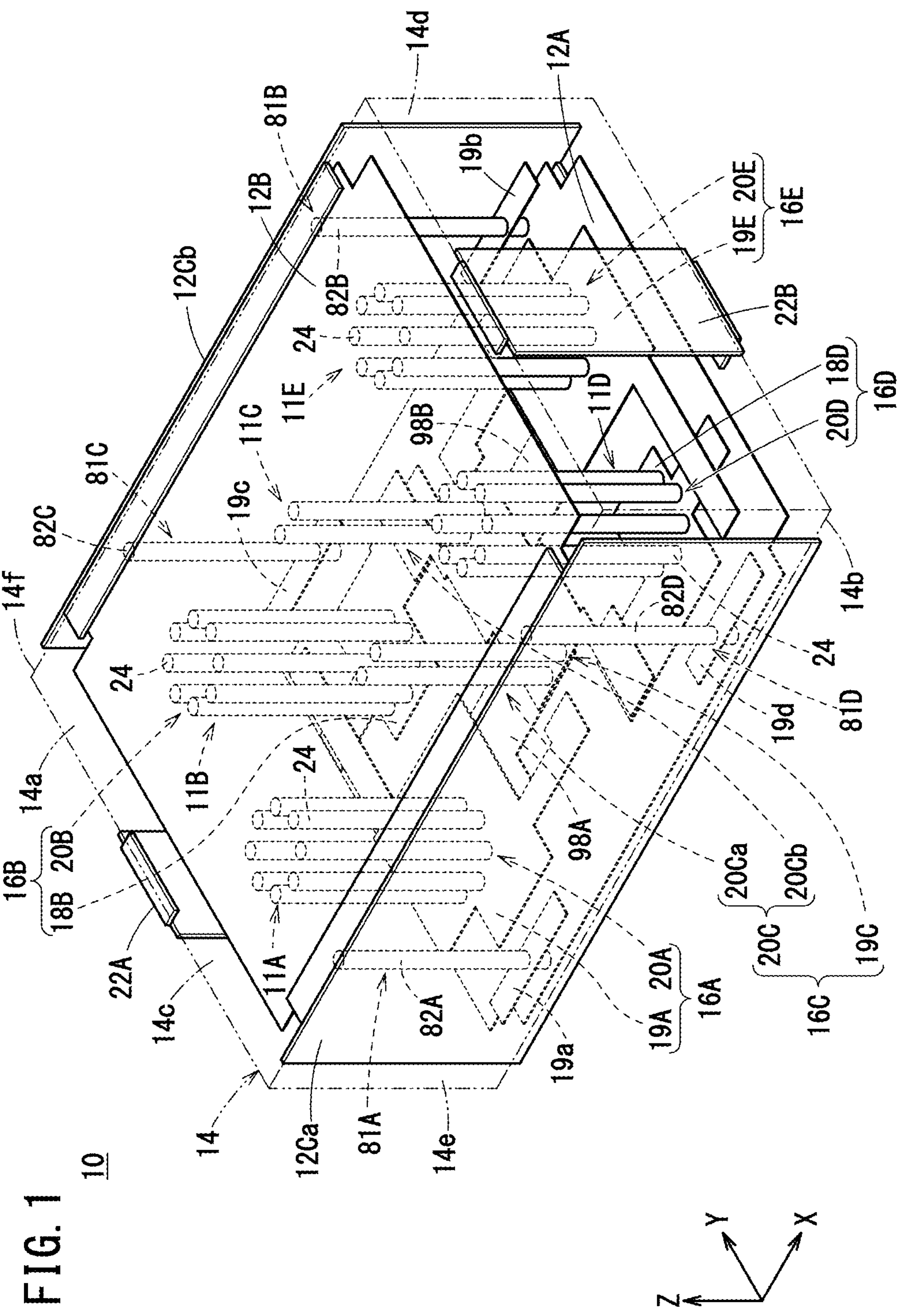
FIG. 1 is a perspective view showing a filter according to a first embodiment.
Figure 2:
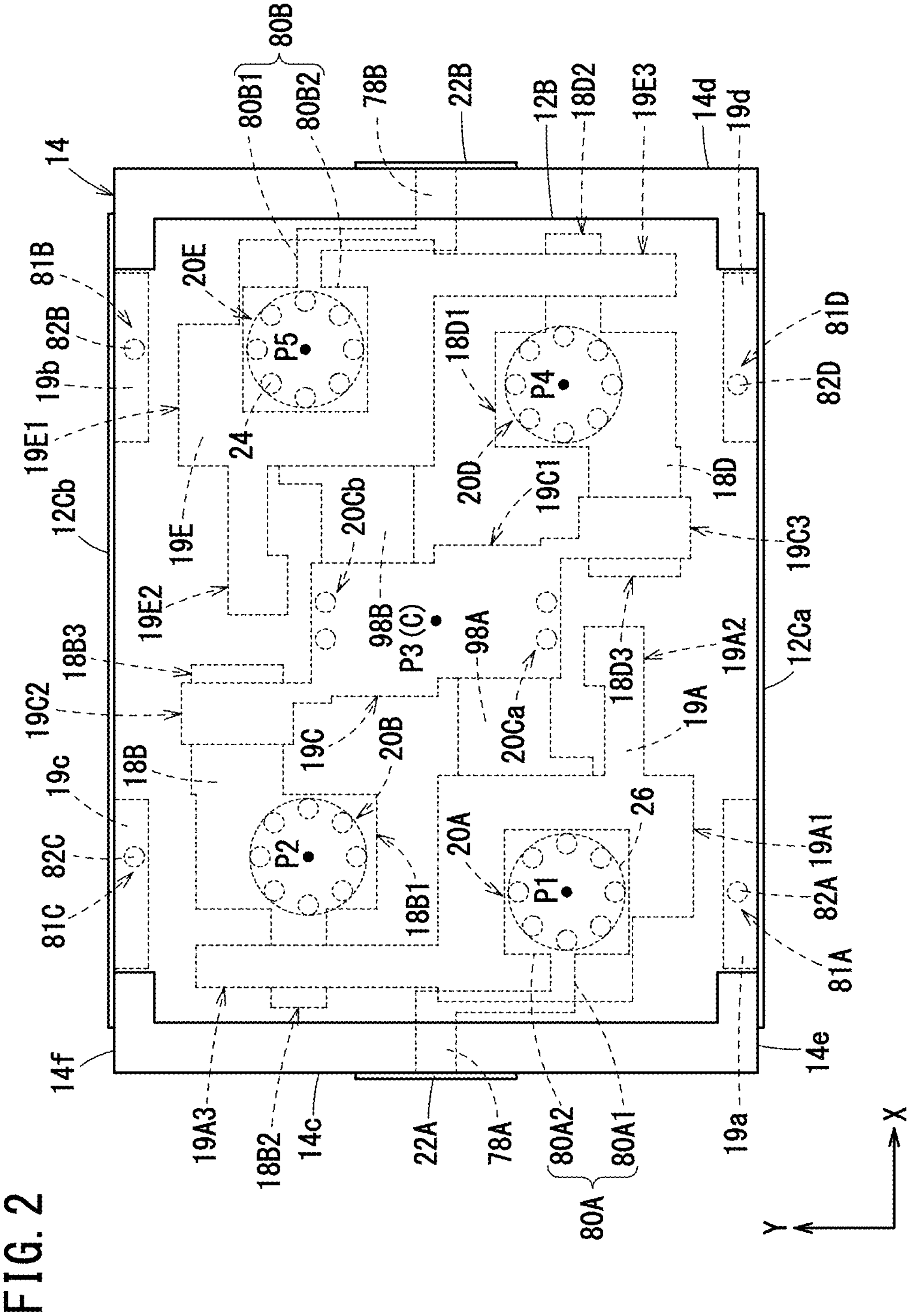
FIG. 2 is a plan view showing the filter according to the first embodiment.
Figure 3A:
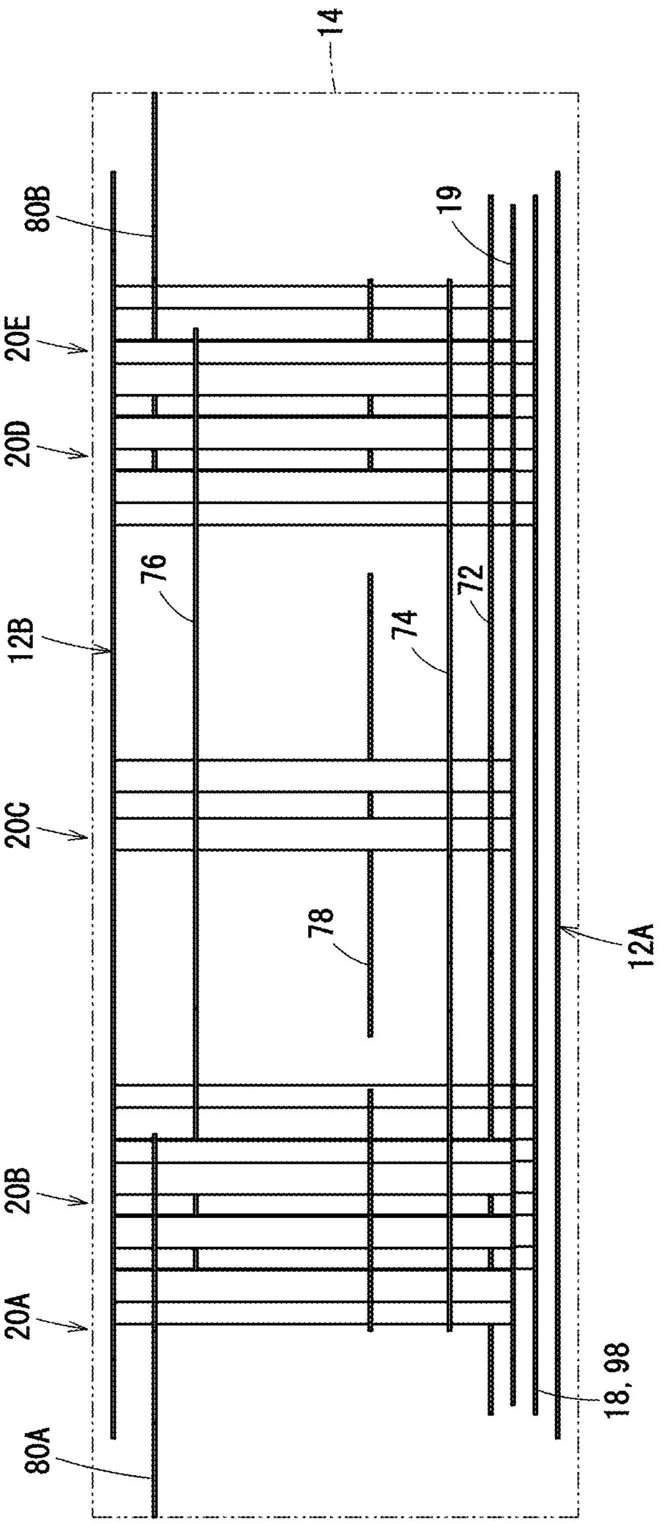
FIG. 3A is a cross-sectional view showing a part of the filter according to the first embodiment.
Figure 3B:
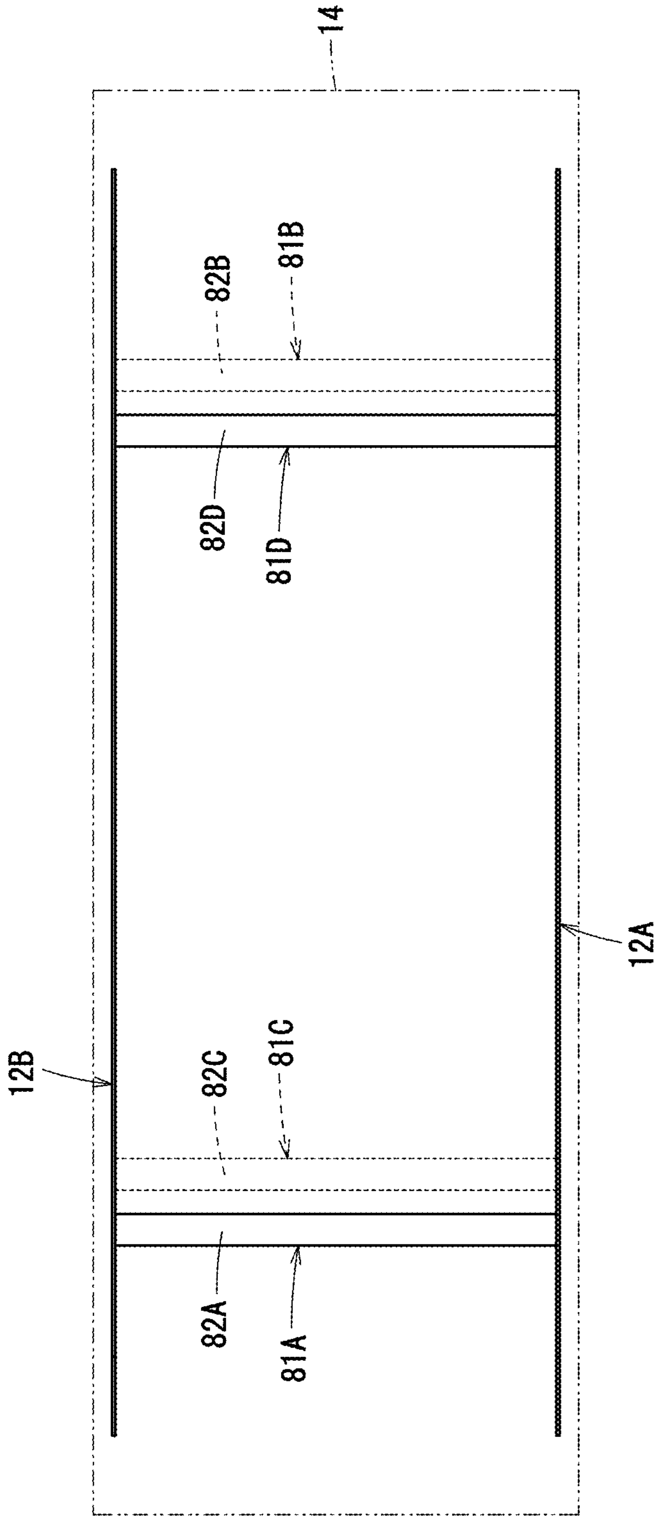
FIG. 3B is a cross-sectional view showing a part of the filter according to the first embodiment.
Figure 4:
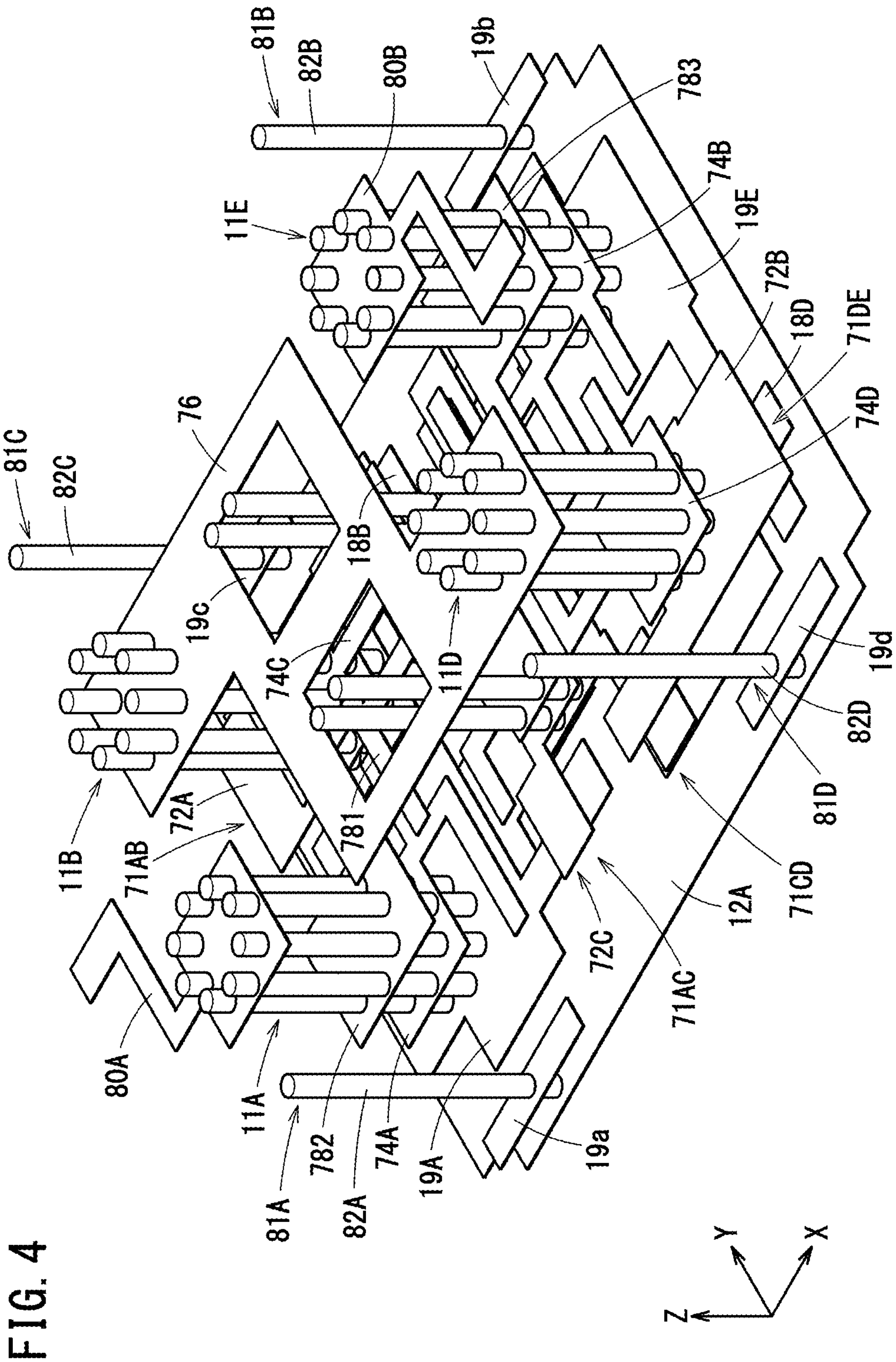
FIG. 4 is a perspective view showing the filter according to the first embodiment.
Figure 5:
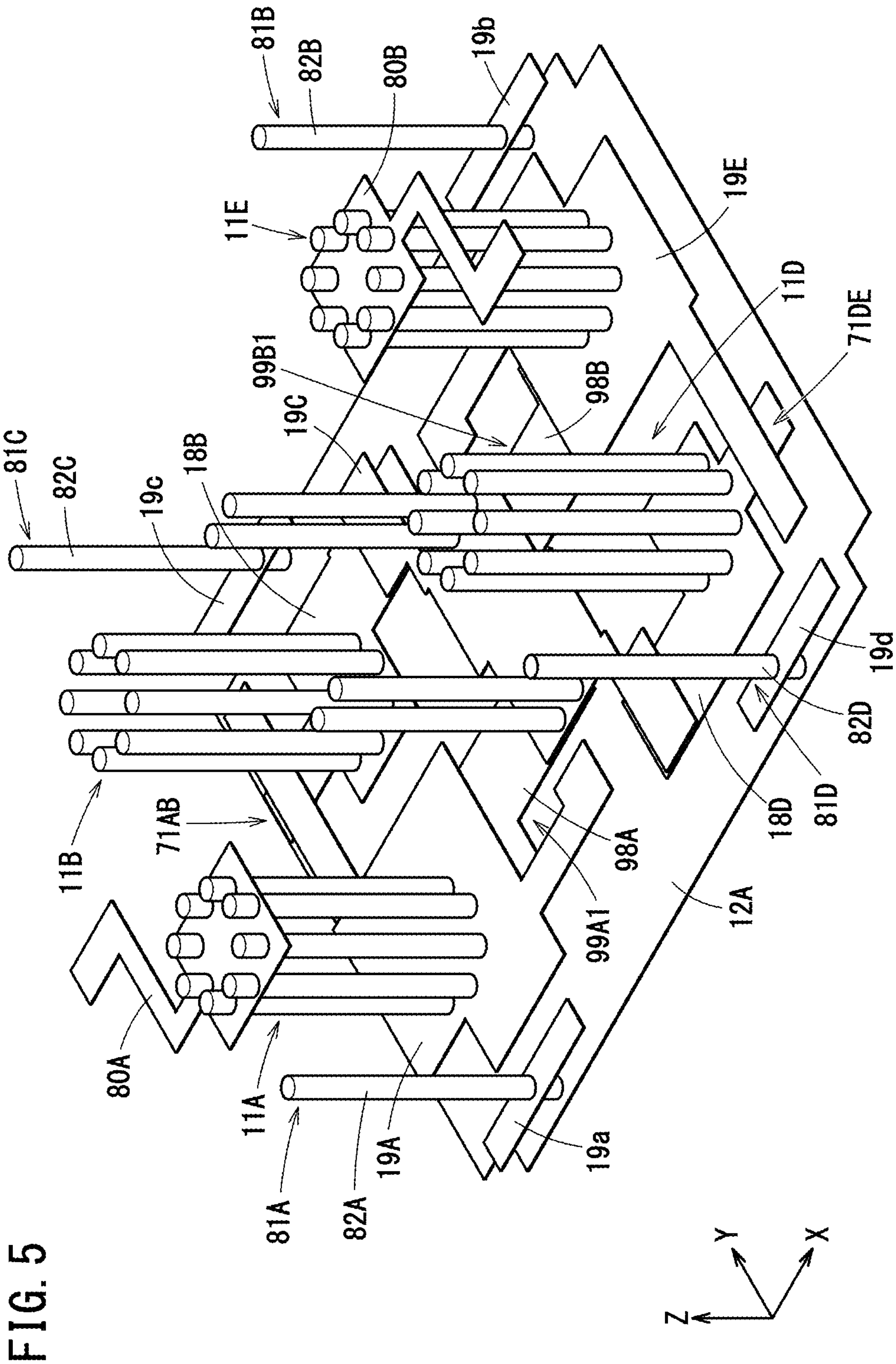
FIG. 5 is a perspective view showing the filter according to the first embodiment.
Figure 6:
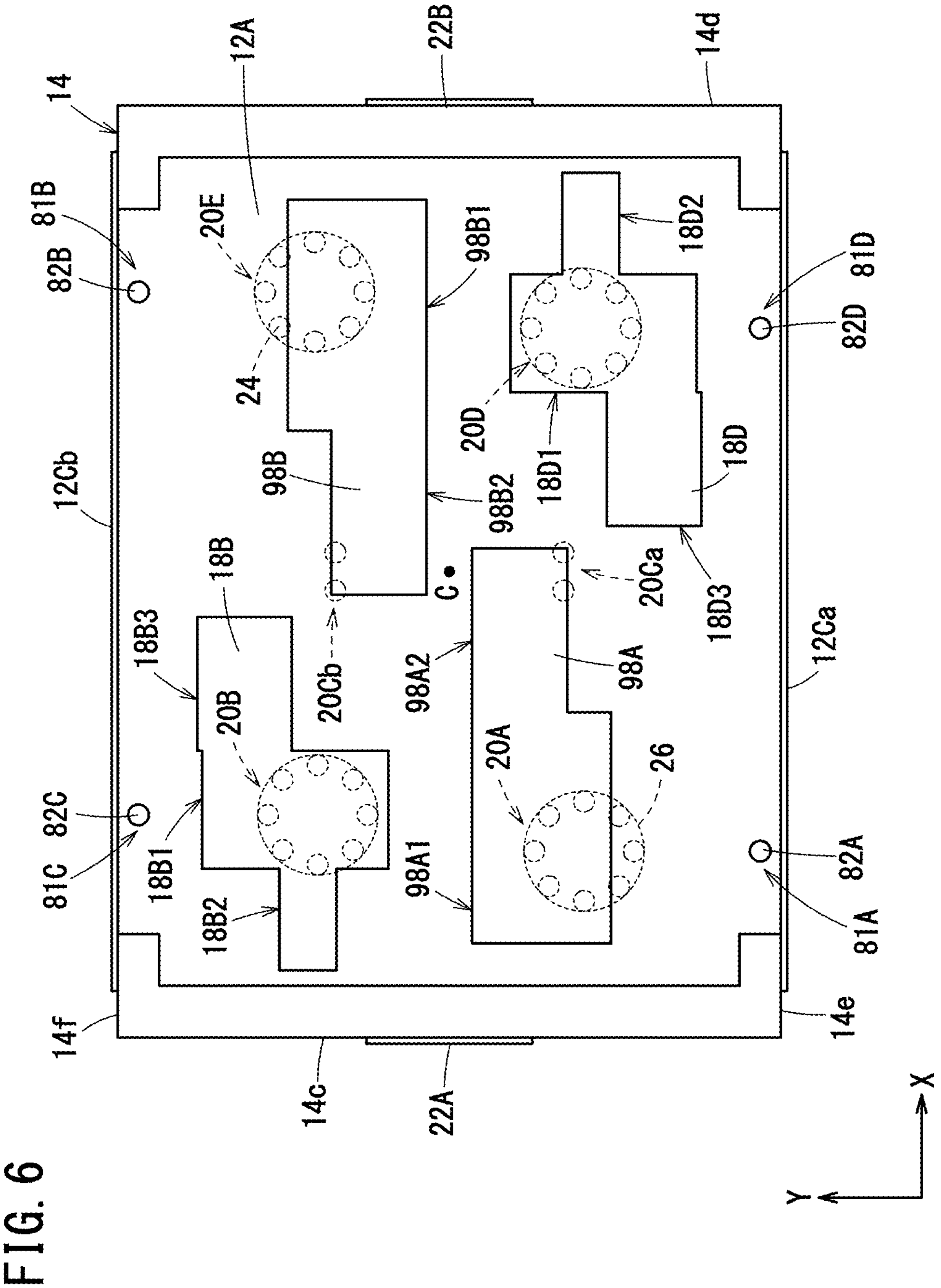
FIG. 6 is a plan view showing the filter according to the first embodiment.
Figure 7:
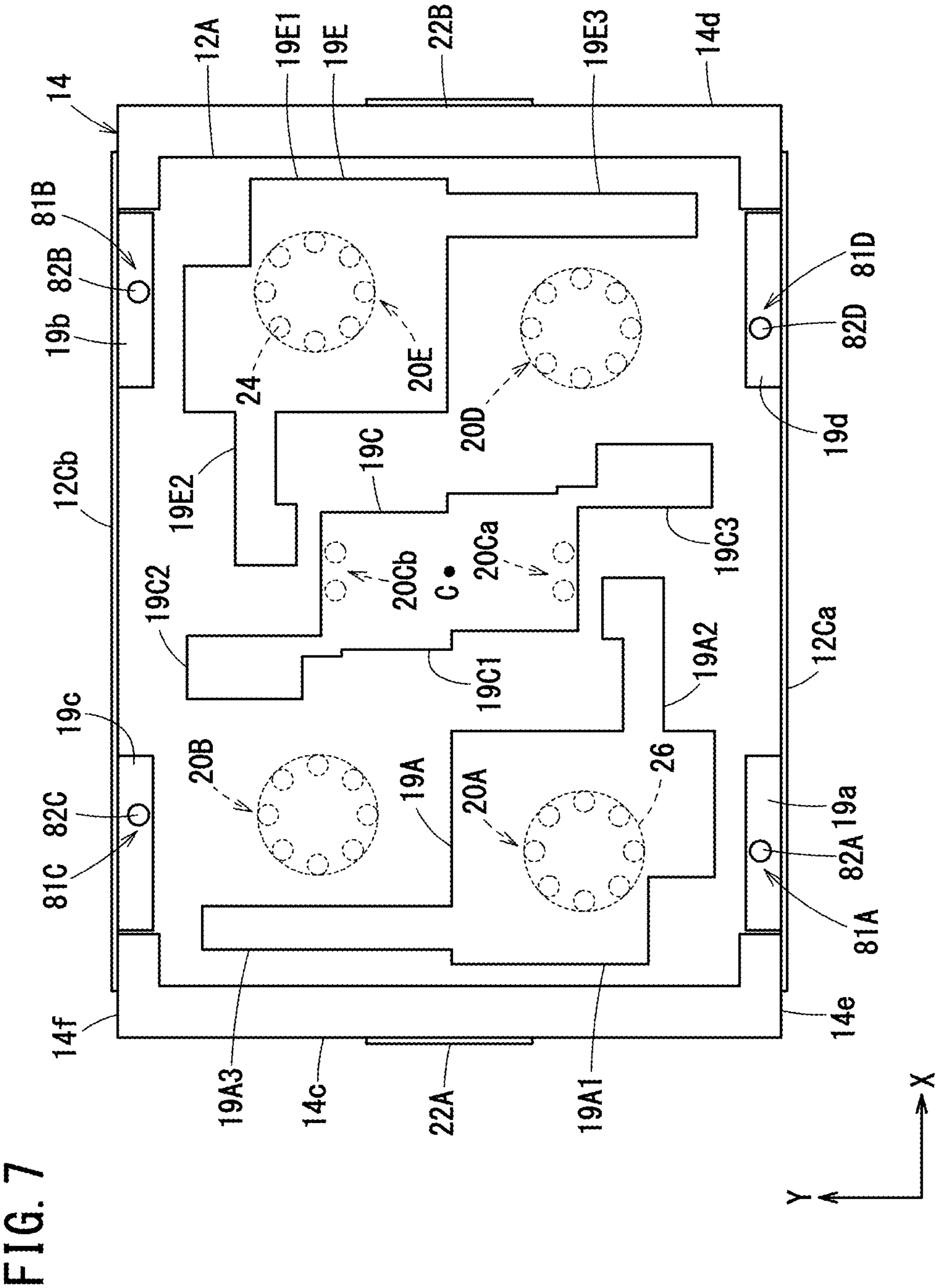
FIG. 7 is a plan view showing the filter according to the first embodiment.
Figure 8:
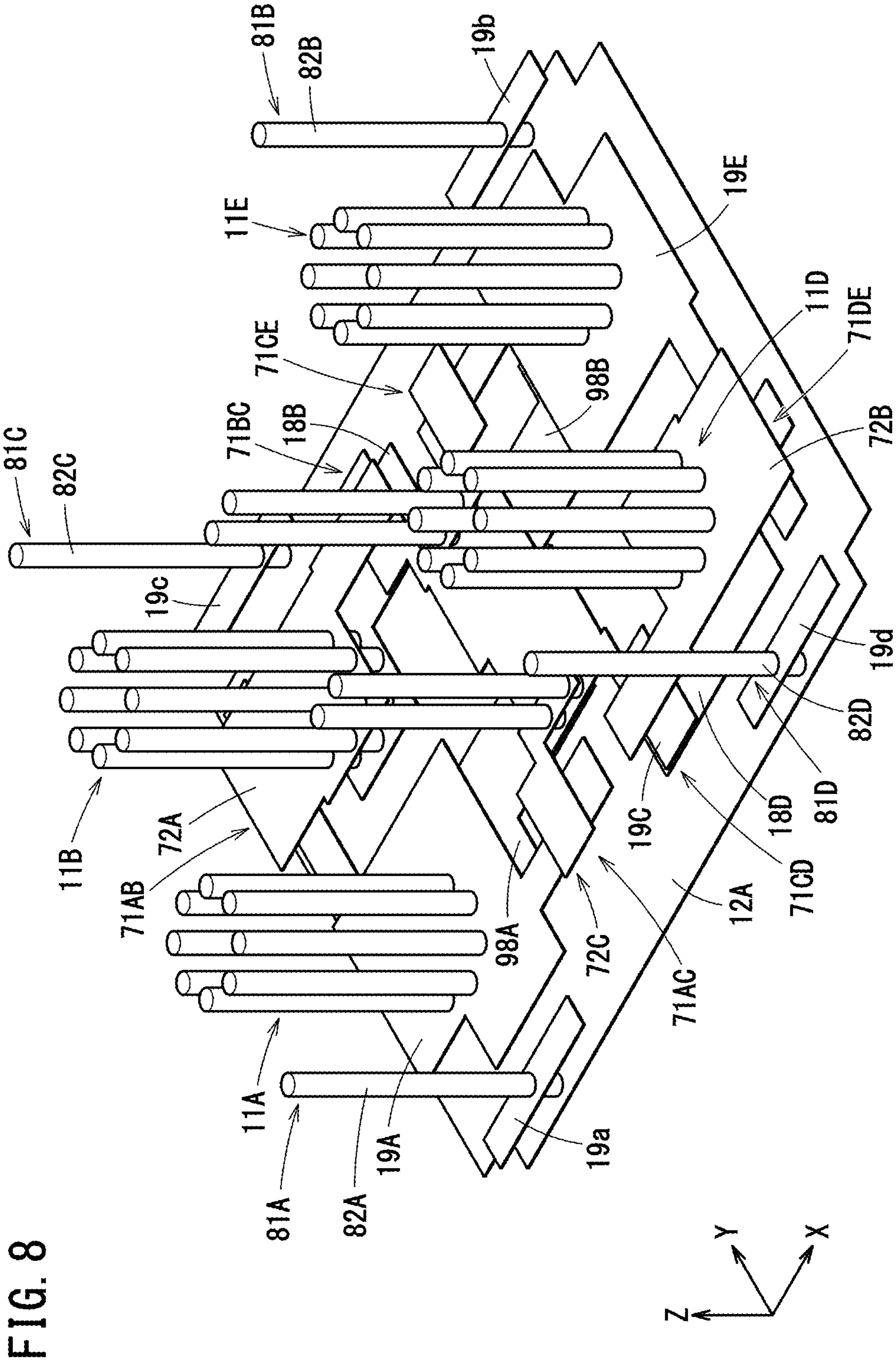
FIG. 8 is a perspective view showing the filter according to the first embodiment.
Figure 9:
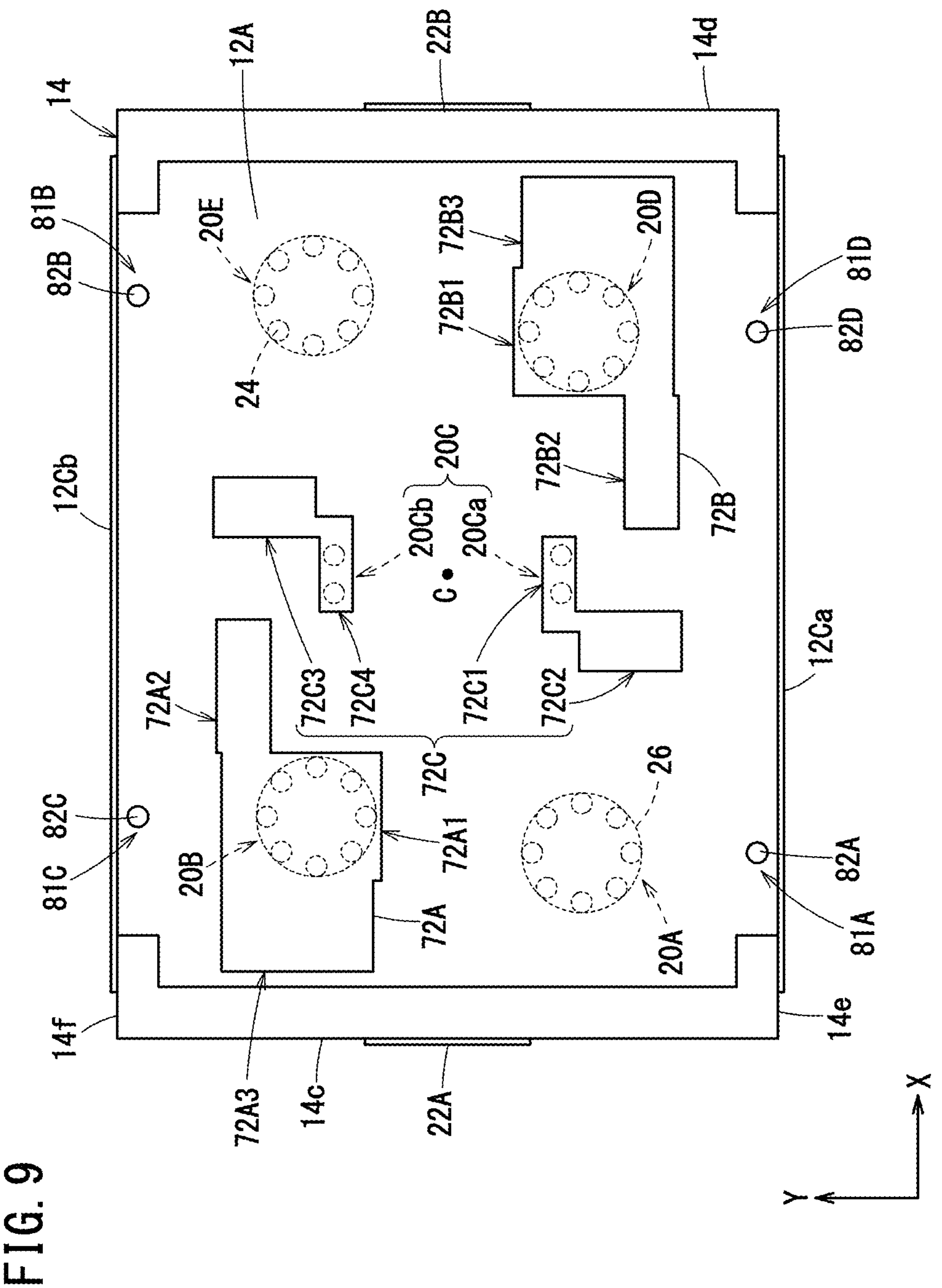
FIG. 9 is a plan view showing the filter according to the first embodiment.
Figure 10:
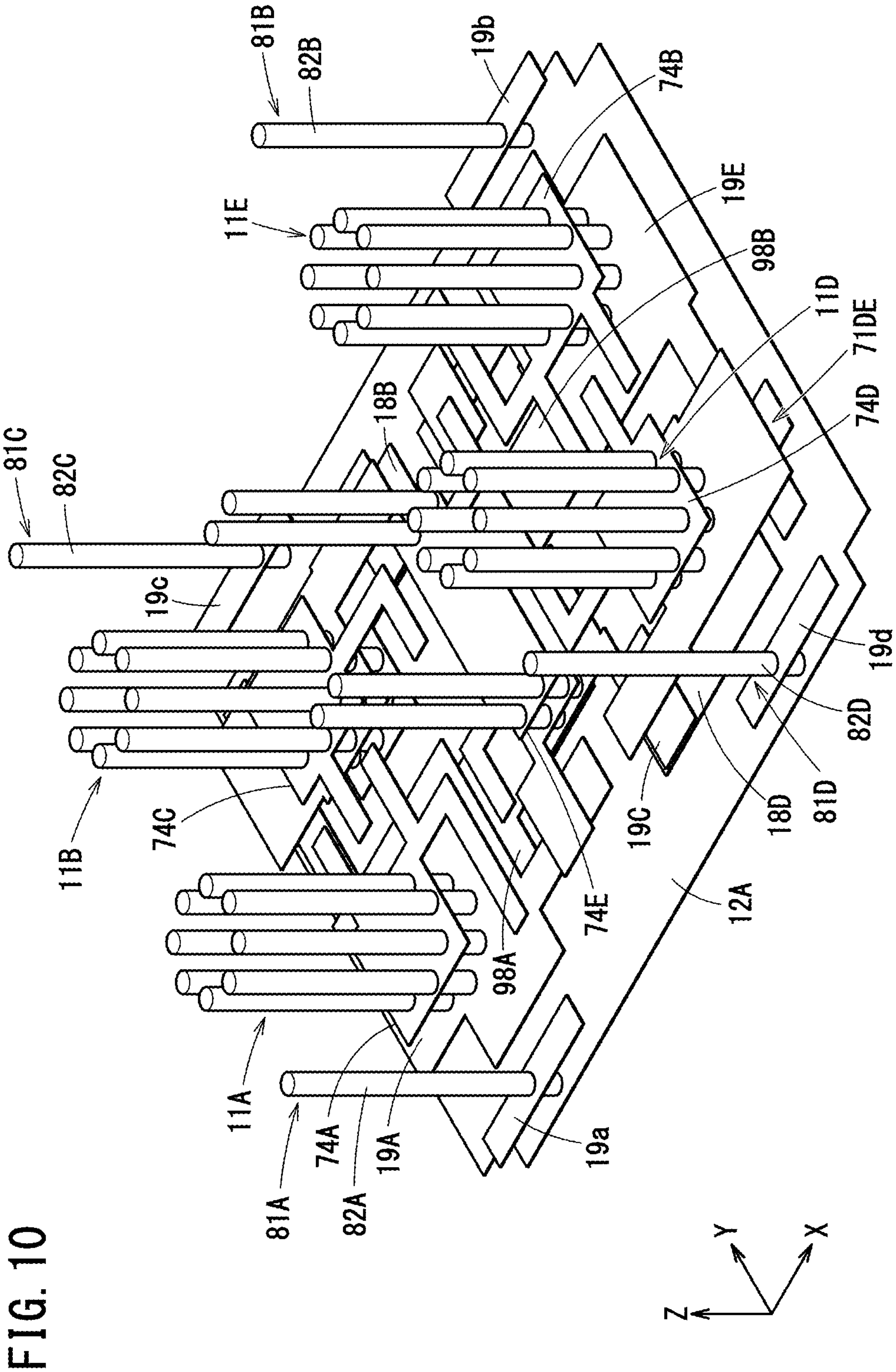
FIG. 10 is a perspective view showing the filter according to the first embodiment.
Figure 11:
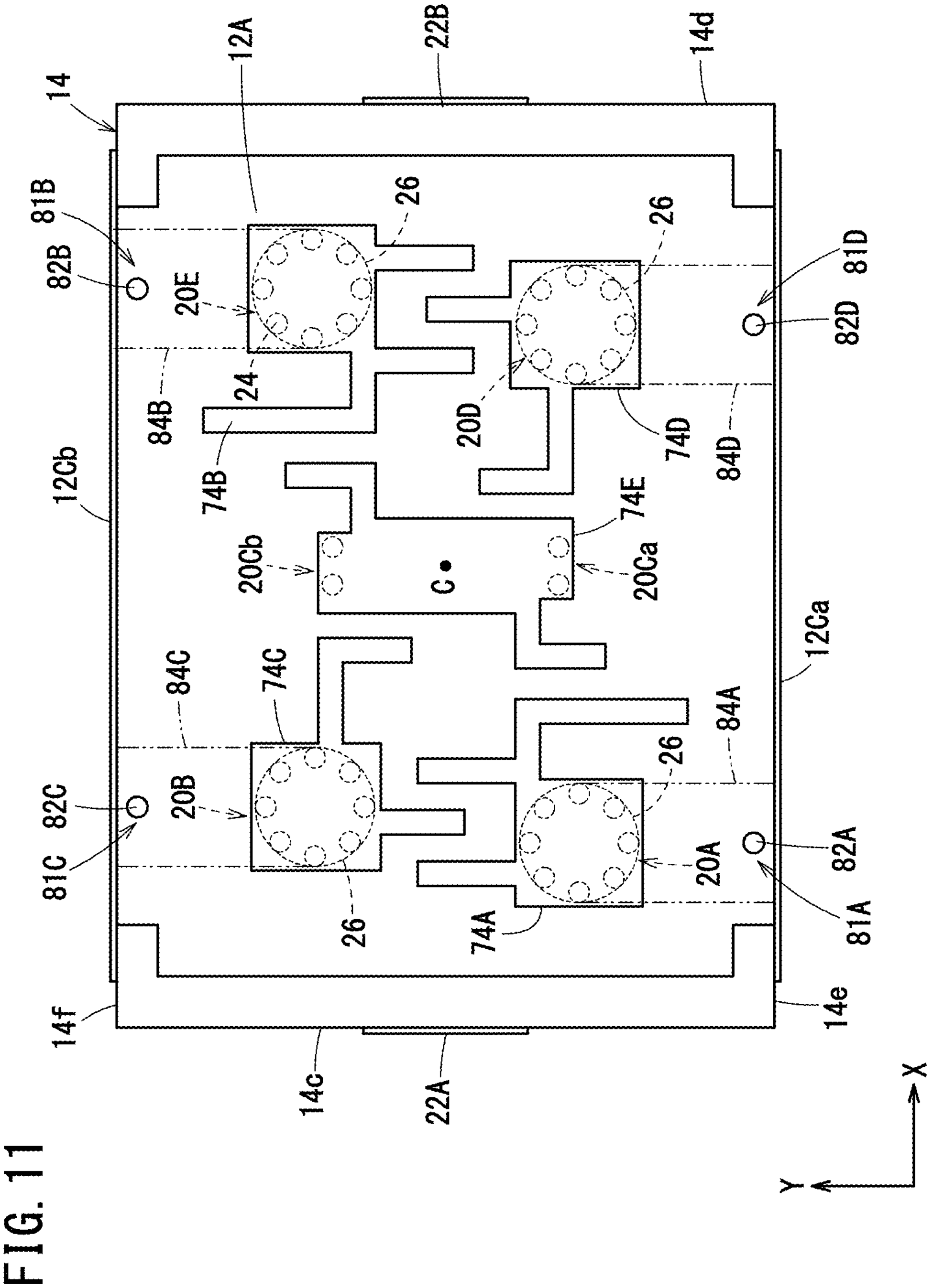
FIG. 11 is a plan view showing the filter according to the first embodiment.
Figure 12:
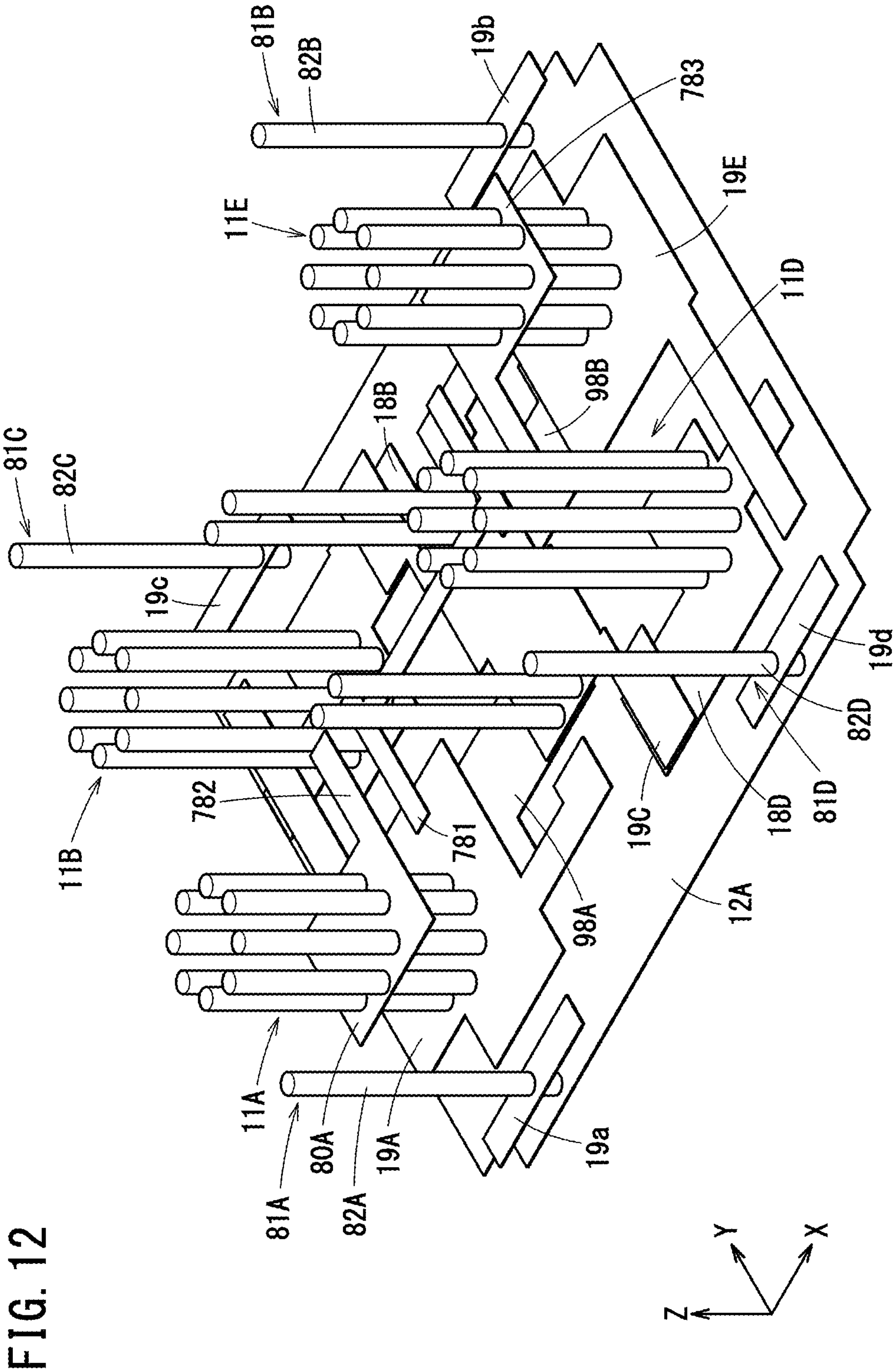
FIG. 12 is a perspective view showing the filter according to the first embodiment.
Figure 13:
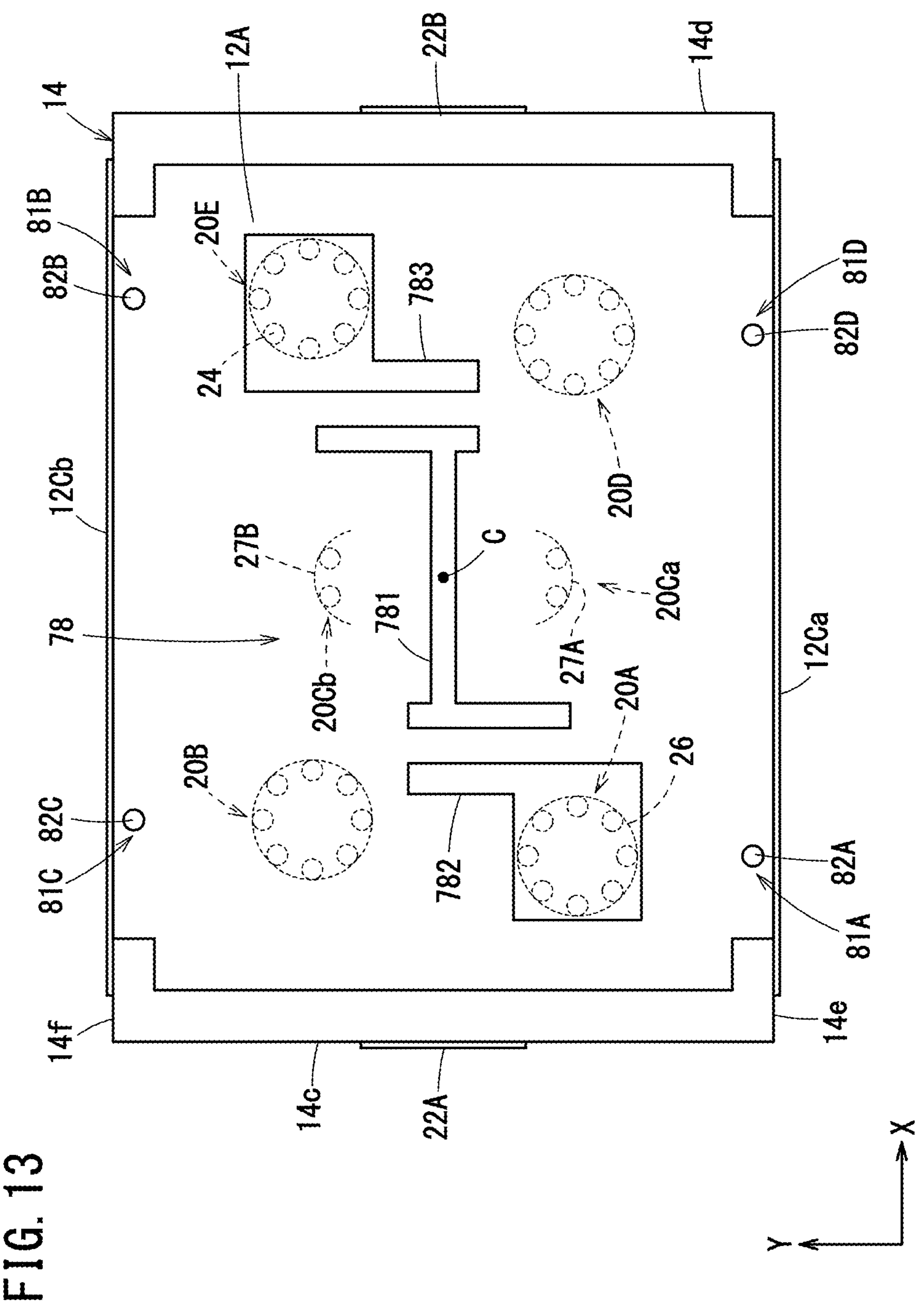
FIG. 13 is a plan view showing the filter according to the first embodiment.
Figure 14:
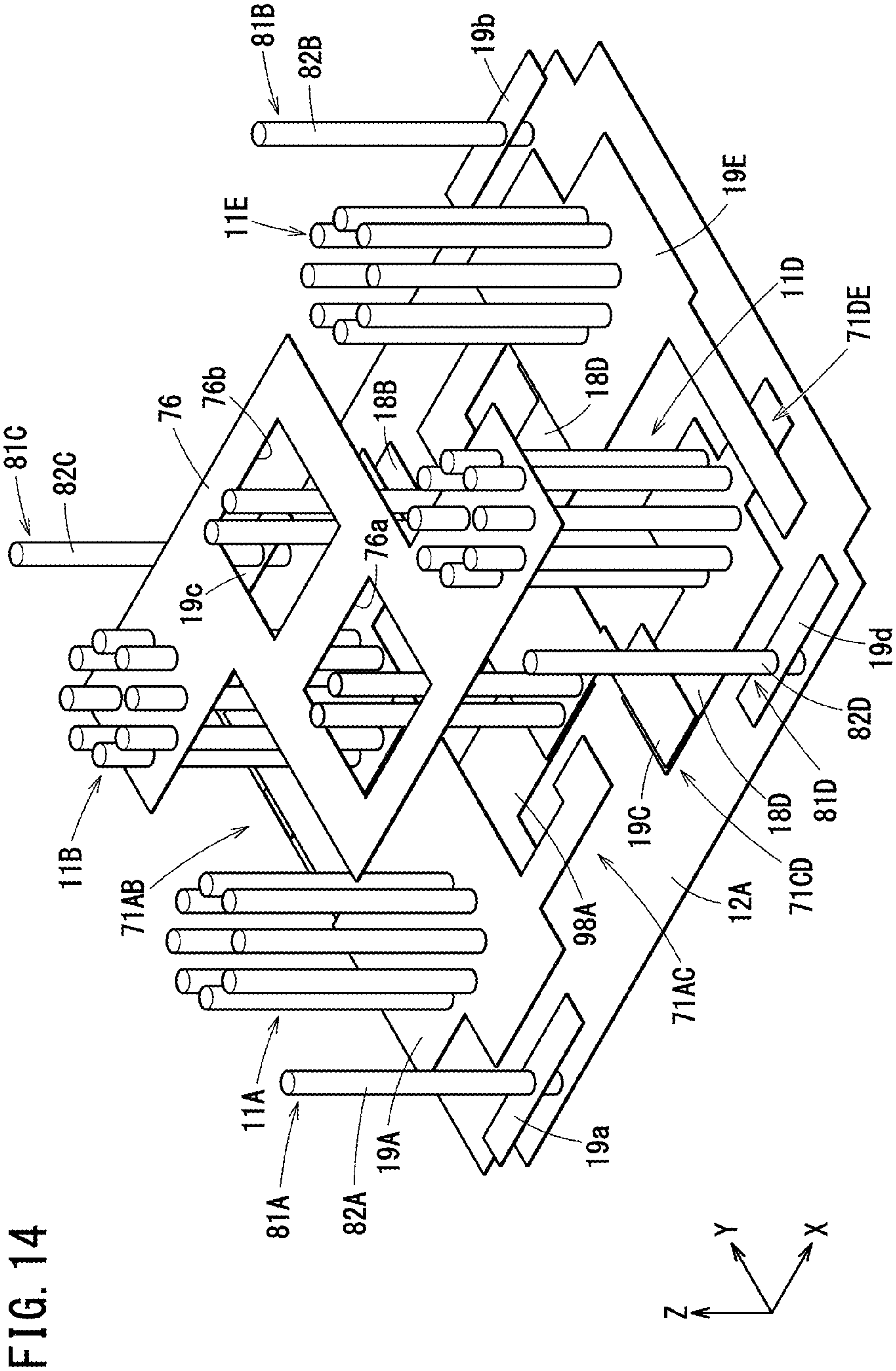
FIG. 14 is a perspective view showing the filter according to the first embodiment.
Figure 15:
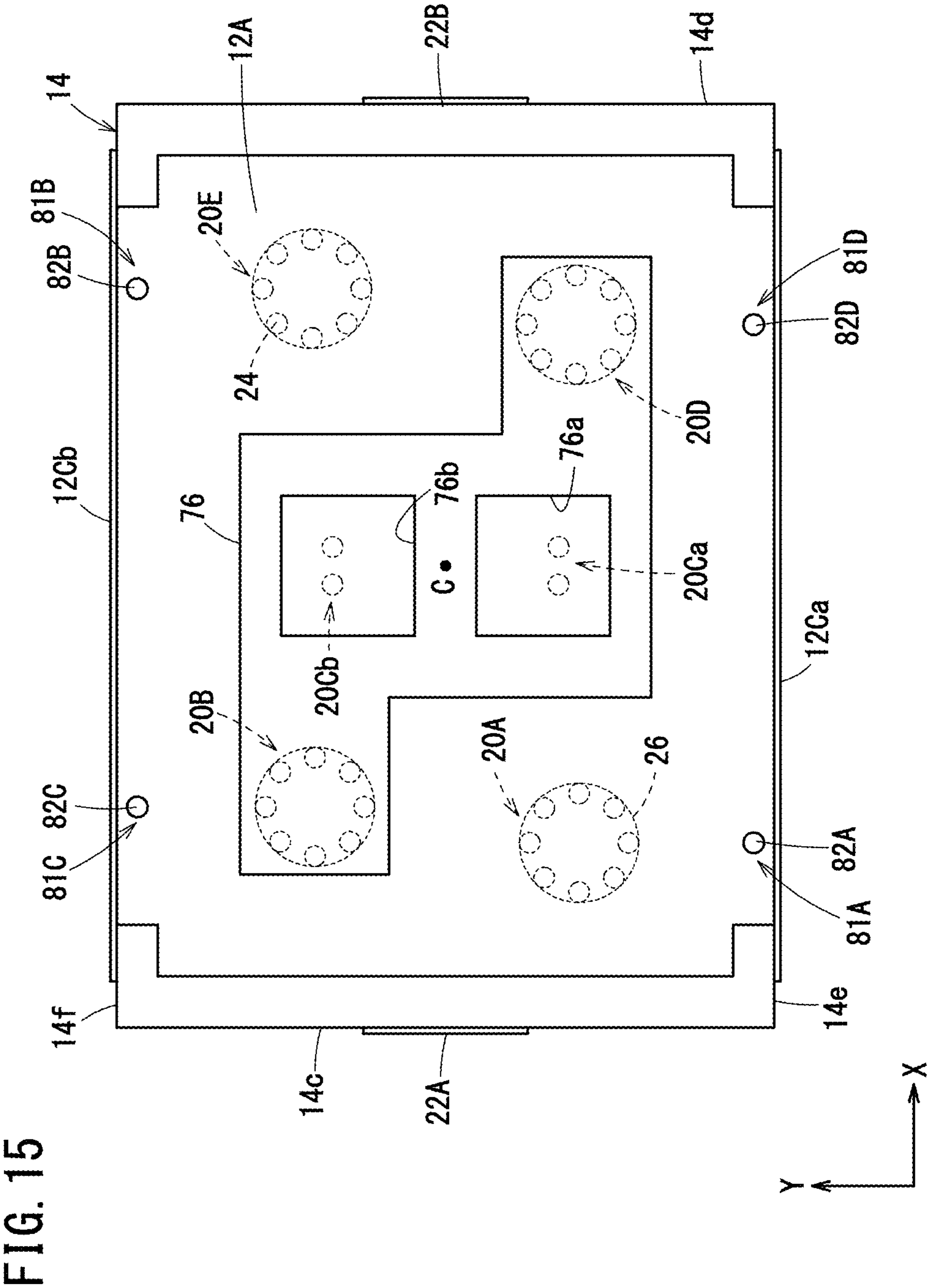
FIG. 15 is a plan view showing the filter according to the first embodiment.

A filter according to a first embodiment will be described with reference to the drawings. FIG. 1 is a perspective view showing the filter according to the first embodiment. FIG. 2 is a plan view showing the filter according to the first embodiment. FIG. 3A and FIG. 3B are cross-sectional views showing a part of the filter according to the first embodiment. FIG. 4 and FIG. 5 are perspective views showing the filter according to the first embodiment. FIG. 6 and FIG. 7 are plan views showing the filter according to the first embodiment. FIG. 8 is a perspective view showing the filter according to the first embodiment. FIG. 9 is a plan view showing the filter according to the first embodiment. FIG. 10 is a perspective view showing the filter according to the first embodiment. FIG. 11 is a plan view showing the filter according to the first embodiment. FIG. 12 is a perspective view showing the filter according to the first embodiment. FIG. 13 is a plan view showing the filter according to the first embodiment. FIG. 14 is a perspective view showing the filter according to the first embodiment. FIG. 15 is a plan view showing the filter according to the first embodiment. For the sake of simplicity, a part of the constituent elements has been appropriately omitted from FIG. 1 to FIG. 15.

As shown in FIG. 1, a filter 10 according to the present embodiment is equipped with a dielectric substrate 14. The dielectric substrate 14 is formed, for example, in the shape of a rectangular parallelepiped, although the present embodiment is not necessarily limited to this feature. The dielectric substrate 14 is constituted by laminating (stacking in layers) a plurality of ceramic sheets (dielectric ceramic sheets).

The dielectric substrate 14 includes two main surfaces 14*a* and 14*b*, and four side surfaces 14*c* to 14*f*. The main surface 14*a* and the main surface 14*b* are positioned on opposite sides of each other. The direction in a normal direction of the side surface 14*c* and the side surface 14*d* is defined as an X direction. More specifically, the normal direction of the side surfaces 14*c* and 14*d* is defined as the X direction. Stated otherwise, a longitudinal direction of the dielectric substrate 14 is defined as the X direction. The direction in the normal direction of the side surface 14*e* and the side surface 14*f* is defined as a Y direction. More specifically, the normal direction of the side surfaces 14*e* and 14*f* is defined as the Y direction. The direction in the normal direction of the main surfaces 14*a* and 14*b* is defined as a Z direction. More specifically, the normal direction of the main surfaces 14*a* and 14*b* is defined as the Z direction.

A shielding conductor 12A is formed on a main surface 14*b* side in the dielectric substrate 14. Specifically, the shielding conductor 12A is formed on a lower part of the dielectric substrate 14. A shielding conductor 12B is formed on a main surface 14*a* side in the dielectric substrate 14. Specifically, the shielding conductor 12B is formed on an upper part of the dielectric substrate 14.

An input/output terminal (a first input/output terminal) 22A is formed on the side surface 14*c* of the dielectric substrate 14. An input/output terminal (a second input/output terminal) 22B is formed on the side surface 14*d* of the dielectric substrate 14.

A shielding conductor 12Ca is formed on the side surface 14*e* of the dielectric substrate 14. A shielding conductor 12Cb is formed on the side surface 14*f* of the dielectric substrate 14. The shielding conductors 12Ca and 12Cb are formed in a plate-like shape. The shielding conductors 12Ca and 12Cb are formed in the longitudinal direction of the dielectric substrate 14.

Within the dielectric substrate 14, capacitor electrodes (strip lines) 18B and 18D are formed that face toward the shielding conductor 12A. The capacitor electrodes 18B and 18D are formed in the same layer. Stated otherwise, the capacitor electrodes 18B and 18D are formed on the same ceramic sheet (not shown). Hereinafter, when the individual capacitor electrodes 18B and 18D are described without distinguishing therebetween, the reference numeral 18 will be used.

Within the dielectric substrate 14, capacitor electrodes (strip lines) 19A, 19C, and 19E are formed therein. The capacitor electrodes 19A, 19C, and 19E are formed in the same layer. Stated otherwise, the capacitor electrodes 19A, 19C, and 19E are formed on the same ceramic sheet (not shown). The layer in which the capacitor electrodes 19A, 19C, and 19E are formed is positioned upwardly with respect to the layer in which the capacitor electrodes 18 are formed. One or more non-illustrated ceramic sheets exist between the capacitor electrodes 19A, 19C, and 19E and the capacitor electrodes 18. Hereinafter, when the individual capacitor electrodes 19A, 19C, and 19E are described without distinguishing therebetween, the reference numeral 19 will be used.

As shown in FIG. 2, the capacitor electrodes 18 are formed in point symmetry, with a center C of the dielectric substrate 14 as viewed in plan serving as the center of symmetry. The capacitor electrode 18B and the capacitor electrode 18D are formed in point symmetry, with the center C of the dielectric substrate 14 as viewed in plan serving as the center of symmetry. In the present embodiment, the feature in which the capacitor electrodes 18 are formed in point symmetry is in order to obtain satisfactory frequency characteristics.

The capacitor electrodes 19 are formed in point symmetry, with the center C of the dielectric substrate 14 as viewed in plan serving as the center of symmetry. The capacitor electrode 19A and the capacitor electrode 19E are formed in point symmetry, with the center C of the dielectric substrate 14 as viewed in plan serving as the center of symmetry. The capacitor electrode 19C is formed in point symmetry, with the center C of the dielectric substrate 14 as viewed in plan serving as the center of symmetry. In the present embodiment, the feature in which the capacitor electrodes 19 are formed in point symmetry is in order to obtain satisfactory frequency characteristics.

The capacitor electrode 18B includes partial patterns (electrode patterns) 18B1 to 18B3. The partial pattern 18B1 is connected to a via electrode portion 20B, which will be described later. One end of the partial pattern 18B2 is connected to the partial pattern 18B1. The partial pattern 18B2 projects out in the −X direction. One end of the partial pattern 18B3 is connected to the partial pattern 18B1. The partial pattern 18B3 projects out in the +X direction.

The capacitor electrode 18D includes partial patterns (electrode patterns) 18D1 to 18D3. The partial pattern 18D1 is connected to the via electrode portion 20D, which will be described later. One end of the partial pattern 18D2 is connected to the partial pattern 18D1. The partial pattern 18D2 projects out in the +X direction. One end of the partial pattern 18D3 is connected to the partial pattern 18D1. The partial pattern 18D3 projects out in the −X direction.

The capacitor electrode 19A includes partial patterns (electrode patterns) 19A1 to 19A3. The partial pattern 19A1 is connected to a via electrode portion 20A, which will be described later. One end of the partial pattern 19A2 is connected to the partial pattern 19A1. The partial pattern 19A2 projects out in the +X direction. One end of the partial pattern 19A3 is connected to the partial pattern 19A1. The partial pattern 19A3 projects out in the +Y direction. A part of the partial pattern 19A3 faces toward a part of the partial pattern 18B2. The part of the partial pattern 19A3 and the part of the partial pattern 18B2 overlap with each other as viewed in plan.

The capacitor electrode 19C includes partial patterns (electrode patterns) 19C1 to 19C3. The partial pattern 19C1 is connected to a via electrode portion 20C (refer to FIG. 1), which will be described later. One end of the partial pattern 19C2 is connected to the partial pattern 19C1. The partial pattern 19C2 projects out in the +Y direction. One end of the partial pattern 19C3 is connected to the partial pattern 19C1. The partial pattern 19C3 projects out in the −Y direction. A part of the partial pattern 19C2 faces toward a part of the partial pattern 18B3. The part of the partial pattern 19C2 and the part of the partial pattern 18B3 overlap with each other as viewed in plan. A part of the partial pattern 19C3 faces toward a part of the partial pattern 18D3. The part of the partial pattern 19C3 and the part of the partial pattern 18D3 overlap with each other as viewed in plan.

The capacitor electrode 19E includes partial patterns (electrode patterns) 19E1 to 19E3. The partial pattern 19E1 is connected to the via electrode portion 20E, which will be described later. One end of the partial pattern 19E2 is connected to the partial pattern 19E1. The partial pattern 19E2 projects out in the −X direction. One end of the partial pattern 19E3 is connected to the partial pattern 19E1. The partial pattern 19E3 projects out in the −Y direction. A part of the partial pattern 19E3 faces toward a part of the partial pattern 18D2. The part of the partial pattern 19E3 and the part of the partial pattern 18D2 overlap with each other as viewed in plan.

Further formed inside the dielectric substrate 14 are electrode patterns 19*a* and 19*d* connected to the shielding conductor 12Ca, and electrode patterns 19*b* and 19*c* connected to the shielding conductor 12Cb. The electrode pattern 19*a* is positioned in the −Y direction with respect to the partial pattern 19A1. The electrode pattern 19*b* is positioned in the +Y direction with respect to the partial pattern 19E1. The electrode pattern 19*c* is positioned in the +Y direction with respect to the partial pattern 18B1. The electrode pattern 19*d* is positioned in the −Y direction with respect to the partial pattern 18D1.

As shown in FIG. 1, via electrode portions 20A to 20E are formed within the dielectric substrate 14. Moreover, when the individual via electrode portions are described without distinguishing therebetween, the reference numeral 20 will be used, and when the individual via electrode portions are described while distinguishing therebetween, the reference numerals 20A to 20E will be used.

The via electrode portions 20 are constituted by a plurality of via electrodes 24. The via electrodes 24 are embedded respectively into via holes that are formed in the dielectric substrate 14.

Ends (lower ends) of the via electrode portions 20B and 20D are connected to the capacitor electrodes 18B and 18D. Ends (lower ends) of the via electrode portions 20A, 20C, and 20E are connected to the capacitor electrodes 19A, 19C, and 19E. Other ends (upper ends) of the via electrode portions 20 is connected to the shielding conductor 12B. The longitudinal direction of the via electrode portions 20 is aligned in the normal direction of the main surfaces 14*a* and 14*b*. In this manner, the via electrode portions 20 are formed from the capacitor electrodes 18 and 19 until reaching the shielding conductor 12B.

A structural body 16A is constituted by the capacitor electrode 19A and the via electrode portion 20A. A structural body 16B is constituted by the capacitor electrode 18B and the via electrode portion 20B. A structural body 16C is constituted by the capacitor electrode 19C and the via electrode portion 20C. A structural body 16D is constituted by the capacitor electrode 18D and the via electrode portion 20D. A structural body 16E is constituted by the capacitor electrode 19E and the via electrode portion 20E. Moreover, when the individual structural bodies are described without distinguishing therebetween, the reference numeral 16 will be used, and when the individual structural bodies are described while distinguishing therebetween, the reference numerals 16A to 16E will be used.

A plurality of resonators 11A to 11E, each respectively including one of the structural bodies 16, are provided in the filter 10. Moreover, when the individual resonators are described without distinguishing therebetween, the reference numeral 11 will be used, and when the individual resonators are described while distinguishing therebetween, the reference numerals 11A to 11E will be used.

The resonator 11A and the resonator 11B are arranged so as to be adjacent to each other. The resonator 11B and the resonator 11C are arranged so as to be adjacent to each other. The resonator 11C and the resonator 11D are arranged so as to be adjacent to each other. The resonator 11D and the resonator 11E are arranged so as to be adjacent to each other.

As shown in FIG. 2, the via electrode portion 20A, the via electrode portion 20B, the via electrode portion 20C, the via electrode portion 20D, and the via electrode portion 20E are shifted mutually from each other in the X direction. The via electrode portion 20C is positioned at the center C of the dielectric substrate 14 as viewed in plan. The position of a center P3 of the via electrode portion 20C as viewed in plan coincides with the position of the center C of the dielectric substrate 14 as viewed in plan.

The position in the X direction of the center P3 of the via electrode portion 20C is between the position in the X direction of the center P1 of the via electrode portion 20A, and the position in the X direction of the center P5 of the via electrode portion 20E. Preferably, the distance between the position in the X direction of the center P3 of the via electrode portion 20C, and the position in the X direction of the center P1 of the via electrode portion 20A is equivalent to the distance between the position in the X direction of the center P3 of the via electrode portion 20C, and the position in the X direction of the center P5 of the via electrode portion 20E.

Similarly, the position in the Y direction of the center P3 of the via electrode portion 20C is between the position in the Y direction of the center P1 of the via electrode portion 20A, and the position in the Y direction of the center P5 of the via electrode portion 20E. Preferably, the distance between the position in the Y direction of the center P3 of the via electrode portion 20C, and the position in the Y direction of the center P1 of the via electrode portion 20A is equivalent to the distance between the position in the Y direction of the center P3 of the via electrode portion 20C, and the position in the Y direction of the center P5 of the via electrode portion 20E.

The position in the Y direction of the center P1 of the via electrode portion 20A is equivalent to the position in the Y direction of the center P4 of the via electrode portion 20D. The position in the Y direction of the center P2 of the via electrode portion 20B is equivalent to the position in the Y direction of the center P5 of the via electrode portion 20E.

The via electrode portion 20B and the via electrode portion 20E are shifted in the Y direction with respect to the via electrode portion 20A and the via electrode portion 20D. The via electrode portion 20A and the via electrode portion 20D are positioned on a side of the side surface 14*e*. Specifically, the distance between the via electrode portions 20A and 20D and the shielding conductor 12Ca is smaller than the distance between the via electrode portions 20A and

20D and the shielding conductor 12Cb. The via electrode portions 20B and 20E are positioned on a side of the side surface 14*f*. Specifically, the distance between the via electrode portions 20B and 20E and the shielding conductor 12Cb is smaller than the distance between the via electrode portions 20B and 20E and the shielding conductor 12Ca.

The position in the X direction of the center P2 of the via electrode portion 20B is between the position in the X direction of the center P1 of the via electrode portion 20A, and the position in the X direction of the center P3 of the via electrode portion 20C. The position in the X direction of the center P4 of the via electrode portion 20D is between the position in the X direction of the center P3 of the via electrode portion 20C, and the position in the X direction of the center P5 of the via electrode portion 20E.

In this manner, according to the present embodiment, the position of the center P1 of the via electrode portion 20A and the position of the center P2 of the via electrode portion 20B are shifted mutually from each other in the X direction. Further, according to the present embodiment, the position of the center P1 of the via electrode portion 20A and the position of the center P2 of the via electrode portion 20B are shifted mutually from each other also in the Y direction. Therefore, according to the present embodiment, without increasing the distance in the X direction between the via electrode portions 20A and 20B, the distance between the via electrode portions 20A and 20B can be made greater.

Further, according to the present embodiment, the position of the center P2 of the via electrode portion 20B and the position of the center P3 of the via electrode portion 20C are shifted mutually from each other in the X direction. Further, according to the present embodiment, the position of the center P2 of the via electrode portion 20B and the position of the center P3 of the via electrode portion 20C are shifted mutually from each other also in the Y direction. Therefore, according to the present embodiment, without increasing the distance in the X direction between the via electrode portions 20B and 20C, the distance between the via electrode portions 20B and 20C can be made greater.

Further, according to the present embodiment, the position of the center P3 of the via electrode portion 20C and the position of the center P4 of the via electrode portion 20D are shifted mutually from each other in the X direction. Further, according to the present embodiment, the position of the center P3 of the via electrode portion 20C and the position of the center P4 of the via electrode portion 20D are shifted mutually from each other also in the Y direction. Therefore, according to the present embodiment, without increasing the distance in the X direction between the via electrode portions 20C and 20D, the distance between the via electrode portions 20C and 20D can be made greater.

Further, according to the present embodiment, the position of the center P4 of the via electrode portion 20D and the position of the center P5 of the via electrode portion 20E are shifted mutually from each other in the X direction. Further, according to the present embodiment, the position of the center P4 of the via electrode portion 20D and the position of the center P5 of the via electrode portion 20E are shifted mutually from each other also in the Y direction. Therefore, according to the present embodiment, without increasing the distance in the X direction between the via electrode portions 20D and 20E, the distance between the via electrode portions 20D and 20E can be made greater.

In this manner, according to the present embodiment, without increasing the distance in the X direction between the adjacent resonators 11A to 11E, it is possible to reduce the degree of coupling between the adjacent resonators 11A to 11E. Therefore, according to the present embodiment, while keeping the size of the filter 10 small, it is possible to obtain the filter 10 having satisfactory characteristics.

The positions in the Y direction of the center P1 of the via electrode portion 20A and the center P4 of the via electrode portion 20D are positioned on a side of the side surface 14*e* with respect to the position in the Y direction of the center C of the dielectric substrate 14. The positions in the Y direction of the center P2 of the via electrode portion 20B and the center P5 of the via electrode portion 20E are positioned on a side of the side surface 14*f* with respect to the position in the Y direction of the center C of the dielectric substrate 14. The positions in the Y direction of the center of the input/output terminal 22A and the center of the input/output terminal 22B are set to be equivalent to the position in the Y direction of the center C of the dielectric substrate 14.

From among the five via electrode portions 20A to 20E, the via electrode portion 20 that is closest in proximity to the input/output terminal 22A is the via electrode portion 20A. The distance in the X direction between the position of the center P1 of the via electrode portion 20A and the position of the input/output terminal 22A is smaller than the distance in the X direction between the position of the center P2 of the via electrode portion 20B and the position of the input/output terminal 22A. The distance in the Y direction between the position of the center P1 of the via electrode portion 20A and the position of the input/output terminal 22A is equivalent to the distance in the Y direction between the position of the center P2 of the via electrode portion 20B and the position of the input/output terminal 22A.

From among the five via electrode portions 20A to 20E, the via electrode portion 20 that is closest in proximity to the input/output terminal 22B is the via electrode portion 20E. The distance in the X direction between the position of the center P5 of the via electrode portion 20E and the position of the input/output terminal 22B is smaller than the distance in the X direction between the position of the center P4 of the via electrode portion 20D and the position of the input/output terminal 22B. The distance in the Y direction between the position of the center P5 of the via electrode portion 20E and the position of the input/output terminal 22B is equivalent to the distance in the Y direction between the position of the center P4 of the via electrode portion 20D and the position of the input/output terminal 22B.

The resonators 11A to 11E are arranged at positions that are point symmetrical, with the center C of the dielectric substrate 14 as viewed in plan serving as the center of symmetry. Specifically, the resonator 11A and the resonator 11E are arranged at positions that are point symmetrical, with the center C of the dielectric substrate 14 as viewed in plan serving as the center of symmetry. Further, the resonator 11B and the resonator 11D are also disposed at positions that are point symmetrical, with the center C of the dielectric substrate 14 as viewed in plan serving as the center of symmetry. The resonator 11C is positioned at the center C of the dielectric substrate 14 as viewed in plan. In the present embodiment, the feature in which the resonators 11A to 11E are formed in point symmetry is in order to obtain satisfactory frequency characteristics.

As shown in FIG. 2, the via electrodes 24 that make up each of the via electrode portions 20A, 20B, 20D, and 20E are arranged along an imaginary circle 26 which is an imaginary circle as viewed in plan. Since the via electrode portions 20 are formed by arranging the plurality of via electrodes 24 along the imaginary circle 26, the via electrode portions 20 can behave such as a large-diameter via electrode corresponding to the imaginary circle 26. Since the via electrode portions 20 are constituted by the plurality of via electrodes 24 each having a comparatively small diameter, the manufacturing process can be simplified. Further, since the via electrode portions 20 are constituted by the plurality of via electrodes 24 each having a comparatively small diameter, any variation in the diameters of the via electrode portions 20 can be reduced. Further, since the via electrode portions 20 are constituted by the plurality of via electrodes 24 each having a comparatively small diameter, the amount of material such as silver or the like that is embedded into the vias can be reduced, and thereby a reduction in cost can be achieved.

The via electrode portion 20C is divided into a partial electrode portion 20Ca and a partial electrode portion 20Cb. The partial electrode portion 20Ca is constituted by the plurality of via electrodes 24. The partial electrode portion 20Cb is also constituted by the plurality of via electrodes 24. The partial electrode portion 20Ca and the partial electrode portion 20Cb are spaced apart from each other in the Y direction. The plurality of via electrodes 24 constituting the partial electrode portion 20Ca are arranged along an imaginary arc 27A constituting a part of an imaginary circle 26 (refer to FIG. 13) as viewed in plan. The plurality via electrodes 24 constituting the partial electrode portion 20Cb are arranged along an imaginary arc 27B (refer to FIG. 13) constituting a part of an imaginary circle 26 as viewed in plan.

In this manner, according to the present embodiment, the via electrode portion 20C that is provided in the resonator 11C is divided into the partial electrode portion 20Ca and the partial electrode portion 20Cb, and the partial electrode portion 20Ca and the partial electrode portion 20Cb are spaced apart from each other in the Y direction. Therefore, according to the present embodiment, the distance between the partial electrode portion 20Ca and the shielding conductor 12Ca becomes short, and together therewith, the distance between the partial electrode portion 20Cb and the shielding conductor 12Cb also becomes short. When the distance between the partial electrode portion 20Ca and the shielding conductor 12Ca becomes short, the coupling capacitance between the partial electrode portion 20Ca and the shielding conductor 12Ca increases. When the distance between the partial electrode portion 20Cb and the shielding conductor 12Cb becomes short, the coupling capacitance between the partial electrode portion 20Cb and the shielding conductor 12Cb increases. Therefore, even in the case that the length of the via electrode portion 20C has become shorter accompanying a reduction in the height of the filter 10, it is possible to suppress a deterioration in the characteristics thereof.

As shown in FIG. 6, coupling capacitance electrodes (plate electrodes) 98A and 98B are formed within the dielectric substrate 14. The coupling capacitance electrode 98A and the coupling capacitance electrode 98B are formed in point symmetry, with the center C of the dielectric substrate 14 as viewed in plan serving as the center of symmetry. In the present embodiment, the feature in which the coupling capacitance electrodes 98 are formed in point symmetry is in order to obtain satisfactory frequency characteristics. Hereinafter, when the individual coupling capacitance electrodes 98A and 98B are described without distinguishing therebetween, the reference numeral 98 will be used.

The coupling capacitance electrode 98 and the capacitor electrodes 18B and 18D are formed in the same layer. Stated otherwise, the coupling capacitance electrodes 98A and 98B and the capacitor electrodes 18B and 18D are formed on the same ceramic sheet (not shown). The layer in which the coupling capacitance electrodes 98 are formed is positioned between the layer in which the capacitor electrodes 19 are formed and the layer in which the shielding conductor 12A is formed. The coupling capacitance electrodes 98 face toward the shielding conductor 12A. The coupling capacitance electrodes 98, for example by using a printing method, are formed in the same manufacturing process as the capacitor electrodes 18. The coupling capacitance electrodes 98 are not connected to any of the plurality of resonators 11.

As shown in FIG. 6, the coupling capacitance electrode 98A includes a first portion 98A1 and a second portion 98A2. A part of the first portion 98A1 faces toward a part of the partial pattern 19A1 (refer to FIG. 7) provided on the capacitor electrode 19A. The part of the first portion 98A1 and the part of the partial pattern 19A1 overlap with each other as viewed in plan. One end of the second portion 98A2 is connected to the first portion 98A1. The second portion 98A2 projects out in the +X direction. A part of the second portion 98A2 faces toward a part of the partial pattern 19C1 (refer to FIG. 7). The part of the second portion 98A2 and the part of the partial pattern 19C1 overlap with each other as viewed in plan. As shown in FIG. 5, a capacitive coupling structure 99A1 is constituted by the capacitor electrode 19A, the coupling capacitance electrode 98A, and the capacitor electrode 19C.

As shown in FIG. 6, the coupling capacitance electrode 98B includes a first portion 98B1 and a second portion 98B2. A part of the first portion 98B1 faces toward a part of the partial pattern 19E1 (refer to FIG. 7) provided on the capacitor electrode 19E. The part of the first portion 98B1 and the part of the partial pattern 19E1 overlap with each other as viewed in plan. One end of the second portion 98B2 is connected to the first portion 98B1. The second portion 98B2 projects out in the −X direction. A part of the second portion 98B2 faces toward a part of the partial pattern 19E2 (refer to FIG. 7). As shown in FIG. 5, a capacitive coupling structure 99B1 is constituted by the capacitor electrode 19E, the coupling capacitance electrode 98B, and the capacitor electrode 19C.

The capacitor electrodes 18 are formed by a printing method. Therefore, when the capacitor electrodes 18 are formed, a relatively large dimensional error may occur. The dimensional error that may occur when forming the capacitor electrodes 18 may cause deterioration of the filter characteristics. Thus, according to the present embodiment, together with the coupling capacitance electrodes 98 being formed in the same layer as the capacitor electrodes 18, by the coupling capacitance electrodes 98 being positioned between the capacitor electrodes 19 and the shielding conductor 12A, a deterioration of the filter characteristics is suppressed.

Since the coupling capacitance electrodes 98 and the capacitor electrodes 18 are formed together by printing, in the case that a dimensional error occurs in the capacitor electrodes 18, a similar dimensional error also occurs in the coupling capacitance electrodes 98. For example, in the case that the dimension of the capacitor electrodes 18 in the X direction has become 0.03 mm larger with respect to the normal dimension, the dimension of the coupling capacitance electrodes 98 in the X direction will also become 0.03 mm larger than the normal dimension. More specifically, according to the present embodiment, in the case that the dimension of the capacitor electrodes 18 has increased, the dimension of the coupling capacitance electrodes 98 positioned between the capacitor electrodes 19 and the shielding conductor 12A also increases in a similar manner. Therefore, in the case that the capacitance between the capacitor electrodes 18 and the shielding conductor 12A has increased due to an increase in the dimension of the capacitor electrodes 18, the coupling capacitance between the capacitor electrodes 19 and the coupling capacitance electrodes 98 also increases due to an increase in the dimension of the coupling capacitance electrodes 98. More specifically, according to the present embodiment, in the case that the capacitance between the capacitor electrodes 18 and the shielding conductor 12A increases, not only the capacitance between the capacitor electrodes 18 and the shielding conductor 12A, but also the coupling capacitance between the capacitor electrodes 19 and the coupling capacitance electrodes 98 increases. Therefore, according to the present embodiment, even in the case that a dimensional error or the like occurs when forming the capacitor electrodes 18, a deterioration of the filter characteristics can be suppressed.

Figure 16:
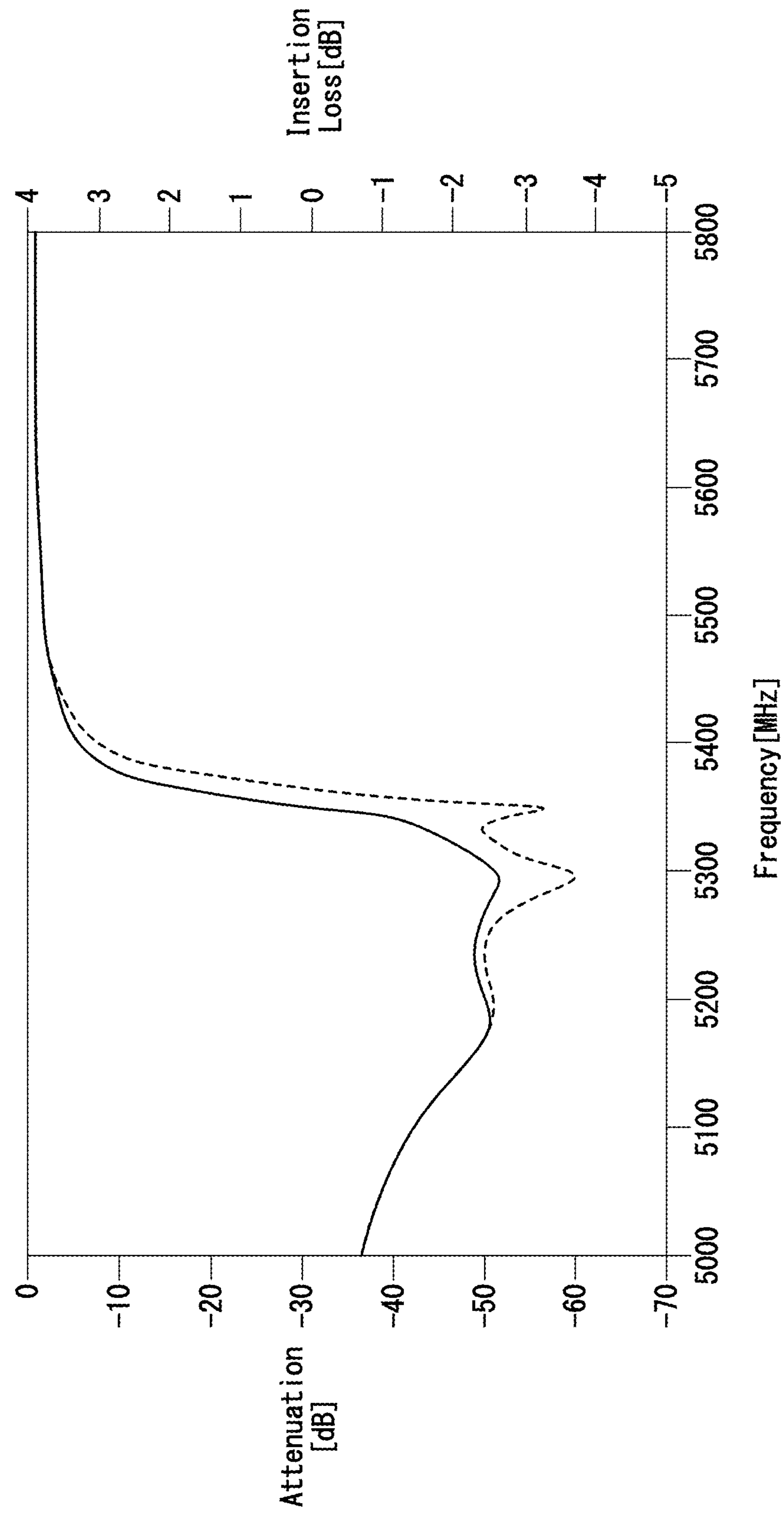
FIG. 16 is a graph illustrating frequency characteristics of a filter according to a comparative example.

FIG. 16 is a graph illustrating frequency characteristics of a filter according to a comparative example. In the filter according to the comparative example, the coupling capacitance electrodes 98 are not included. The horizontal axis in FIG. 16 represents frequency. The vertical axis in FIG. 16 represents an amount of attenuation. In FIG. 16, the filter characteristics in the case that an error is not occurring in the dimension of the capacitor electrode 18 are shown by the dashed line. Further, in FIG. 16, the filter characteristics in the case that the dimension of the capacitor electrode 18 has become 5 μm larger than the design value are shown by the solid line. As shown in FIG. 16, in the comparative example, if a dimensional error occurs when forming the capacitor electrodes 18, the filter characteristics are significantly deteriorated.

Figure 17:
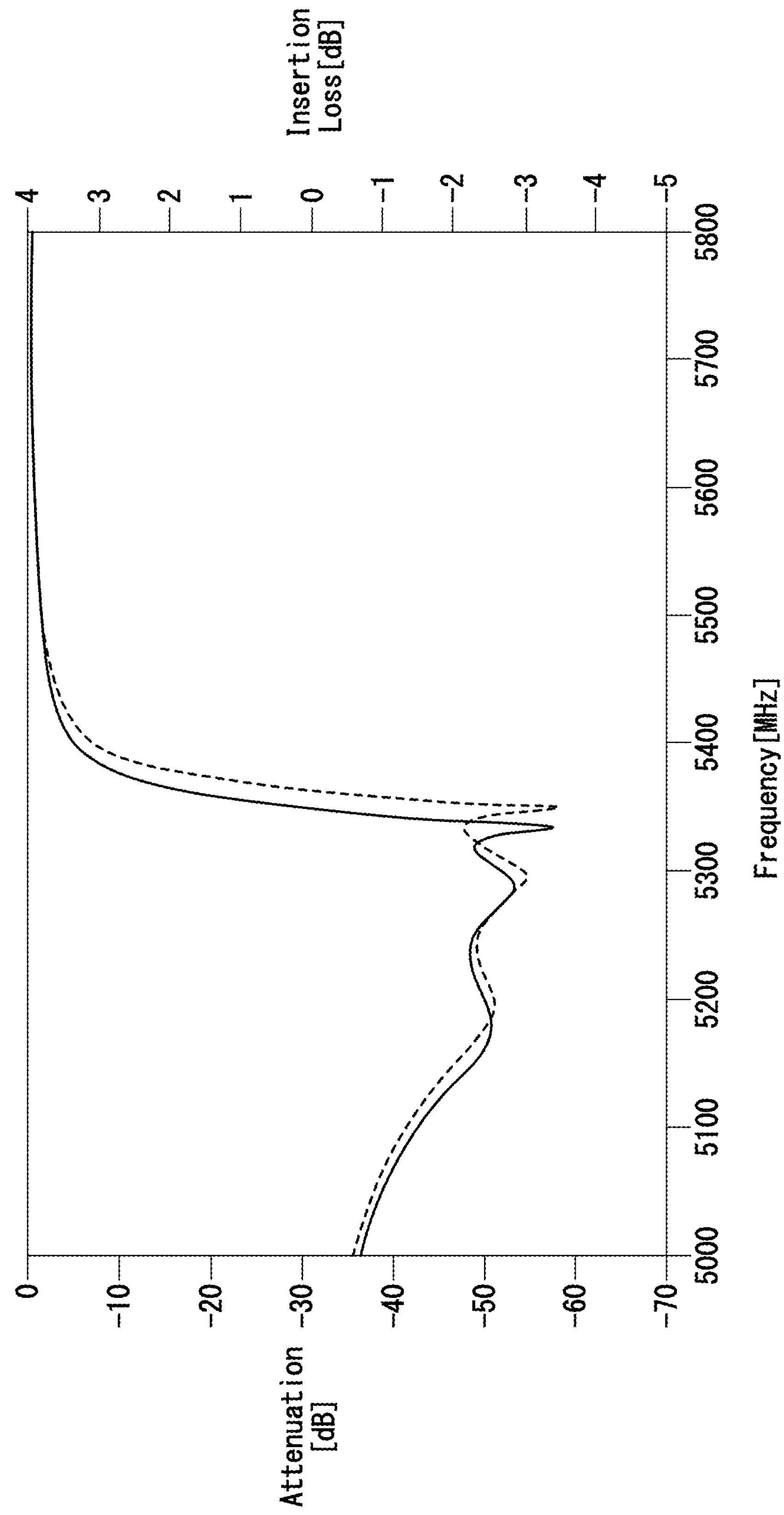
FIG. 17 is a graph illustrating frequency characteristics of a filter according to the first embodiment.

FIG. 17 is a graph illustrating frequency characteristics of the filter according to the present embodiment. The horizontal axis in FIG. 17 represents frequency. The vertical axis in FIG. 17 represents an amount of attenuation. In FIG. 17, the filter characteristics in the case that an error is not occurring in the dimension of the capacitor electrode 18 are shown by the dashed line. Further, in FIG. 17, the filter characteristics in the case that the dimension of the capacitor electrode 18 has become 5 μm larger than the design value are shown by the solid line. As shown in FIG. 17, according to the present embodiment, even in the case that a dimensional error has occurred when forming the capacitor electrodes 18, a deterioration of the filter characteristics can be suppressed.

As shown in FIG. 8 and FIG. 9, coupling capacitance electrodes (plate electrodes) 72A to 72C are formed within the dielectric substrate 14. The coupling capacitance electrodes 72A to 72C are formed in the same layer. Stated otherwise, the coupling capacitance electrodes 72A to 72C are formed on the same ceramic sheet (not shown). The layer in which the coupling capacitance electrodes 72A to 72C are formed is positioned upwardly with respect to the layer in which the capacitor electrodes 19 are formed. One or more non-illustrated ceramic sheets exist between the coupling capacitance electrodes 72A to 72C and the capacitor electrodes 19. The coupling capacitance electrode 72A is connected to the via electrode portion 20B provided in the resonator 11B. The coupling capacitance electrode 72B is connected to the via electrode portion 20D provided in the resonator 11D. The coupling capacitance electrode 72C is connected to the via electrode portion 20C provided in the resonator 11C. When the individual coupling capacitance electrodes are described without distinguishing therebetween, the reference numeral 72 will be used, and when the individual coupling capacitance electrodes are described while distinguishing therebetween, the reference numerals 72A to 72C will be used.

The coupling capacitance electrodes 72 are formed in point symmetry, with the center C of the dielectric substrate 14 as viewed in plan serving as the center of symmetry. The coupling capacitance electrode 72A and the coupling capacitance electrode 72B are formed in point symmetry, with the center C of the dielectric substrate 14 as viewed in plan serving as the center of symmetry. The coupling capacitance electrode 72C is formed in point symmetry, with the center C of the dielectric substrate 14 as viewed in plan serving as the center of symmetry. In the present embodiment, the feature in which the coupling capacitance electrodes 72 are formed in point symmetry is in order to obtain satisfactory frequency characteristics.

The coupling capacitance electrode 72A includes partial patterns (electrode patterns) 72A1 to 72A3. The partial pattern 72A1 is connected to the via electrode portion 20B. One end of the partial pattern 72A2 is connected to the partial pattern 72A1. The partial pattern 72A2 projects out in the +X direction. A part of the partial pattern 72A2 overlaps with a part of the partial pattern 19C2 as viewed in plan (refer to FIG. 7). One end of the partial pattern 72A3 is connected to the partial pattern 72A1. The partial pattern 72A3 projects out in the −X direction. A part of the partial pattern 72A3 overlaps with a part of the partial pattern 19A3 as viewed in plan.

The coupling capacitance electrode 72B includes partial patterns (electrode patterns) 72B1 to 72B3. The partial pattern 72B1 is connected to the via electrode portion 20D. One end of the partial pattern 72B2 is connected to the partial pattern 72B1. The partial pattern 72B2 projects out in the −X direction. A part of the partial pattern 72B2 overlaps with a part of the partial pattern 19C3 as viewed in plan. One end of the partial pattern 72B3 is connected to the partial pattern 72B1. The partial pattern 72B3 projects out in the +X direction. A part of the partial pattern 72B3 overlaps with a part of the partial pattern 19E3 as viewed in plan.

The coupling capacitance electrode 72C includes partial patterns (electrode patterns) 72C1 to 72C4. The partial pattern 72C1 is connected to the partial electrode portion 20Ca. The partial pattern 72C4 is connected to the partial electrode portion 20Cb. More specifically, the partial pattern 72C1 and the partial pattern 72C4 are connected to the via electrode portion 20C. The partial pattern 72C1 and the partial pattern 72C4 are spaced apart from each other in the Y direction. One end of the partial pattern 72C2 is connected to the partial pattern 72C1. The partial pattern 72C2 projects out in the −Y direction. A part of the partial pattern 72C2 overlaps with a part of the partial pattern 19A2 as viewed in plan. One end of the partial pattern 72C3 is connected to the partial pattern 72C4. The partial pattern 72C3 projects out in the +Y direction. A part of the partial pattern 72C3 overlaps with a part of the partial pattern 19E2 as viewed in plan.

As noted previously, a part of the partial pattern 19A3 and a part of the partial pattern 18B2 face toward each other. Stated otherwise, the capacitor electrode 19A is provided with the partial pattern 19A3 that faces toward a part of the capacitor electrode 18B that is formed in the same layer as the coupling capacitance electrodes 98. In this manner, a capacitive coupling structure 71AB (refer to FIG. 8) is constituted including the partial pattern 19A3 and the partial pattern 18B2.

As noted previously, a part of the partial pattern 19E3 and a part of the partial pattern 18D2 face toward each other. Stated otherwise, the capacitor electrode 19E is provided with the partial pattern 19E3 that faces toward a part of the capacitor electrode 18D that is formed in the same layer as the coupling capacitance electrodes 98. In this manner, a capacitive coupling structure 71DE (refer to FIG. 8) is constituted including the partial pattern 19E3 and the partial pattern 18D2.

As noted previously, a part of the partial pattern 18B3, a part of the partial pattern 19C2, and a part of the partial pattern 72A2 overlap with each other. In this manner, a capacitive coupling structure 71BC (refer to FIG. 8) is constituted including the partial pattern 18B3, the partial pattern 19C2, and the partial pattern 72A2.

As noted previously, a part of the partial pattern 18D3, a part of the partial pattern 19C3, and a part of the partial pattern 72B2 overlap with each other. In this manner, a capacitive coupling structure 71CD (refer to FIG. 8) is constituted including the partial pattern 18D3, the partial pattern 19C3, and the partial pattern 72B2.

As noted previously, a part of the partial pattern 19A2 and a part of the partial pattern 72C2 overlap with each other. In this manner, a capacitive coupling structure 71AC (refer to FIG. 8) is constituted including the partial pattern 19A2 and the partial pattern 72C2.

As noted previously, a part of the partial pattern 19E2 and a part of the partial pattern 72C3 overlap with each other. In this manner, a capacitive coupling structure 71CE (refer to FIG. 8) is constituted including the partial pattern 19E2 and the partial pattern 72C3. When the individual capacitive coupling structures are described without distinguishing therebetween, the reference numeral 71 will be used, and when the individual capacitive coupling structures are described while distinguishing therebetween, the reference numerals 71AB, 71BC, 71CD, 71DE, 71AC, and 71CE will be used.

In the present embodiment, parts of the capacitive coupling structures 71 are constituted by the partial patterns 18B2, 18B3, 18D2, 18D3, 19A2, and 19E2 that constitute parts of the capacitor electrodes 18 and 19 for the following reasons. That is, when the height of the filter 10 is simply made shorter, a satisfactory Q-factor is not obtained. Specifically, in the case that the filter 10 is simply made shorter in height in a state in which the distance in the Z direction between the capacitor electrodes 18 and 19 and the capacitive coupling structures 71 is set to be relatively large, a satisfactory Q-factor cannot be obtained. In contrast to this feature, when the distance in the Z direction between the capacitor electrodes 18 and 19 and the capacitive coupling structures 71 is made relatively small, a satisfactory Q-factor can be obtained. According to the present embodiment, the parts of the capacitive coupling structures 71 are constituted by the partial patterns 18B2, 18B3, 18D2, 18D3, 19A2, and 19E2 that constitute the parts of the capacitor electrodes 18. Specifically, according to the present embodiment, the distance in the Z direction between the capacitor electrodes 18 and 19 and the capacitive coupling structure 71 is set to zero.

As shown in FIG. 10 and FIG. 11, coupling capacitance electrodes (plate electrodes) 74A to 74E are formed within the dielectric substrate 14. The coupling capacitance electrodes 74A to 74E are formed in the same layer. Stated otherwise, the coupling capacitance electrodes 74A to 74E are formed on the same ceramic sheet (not shown). The layer in which the coupling capacitance electrodes 74A to 74E are formed is positioned upwardly with respect to the layer in which the coupling capacitance electrodes 72A to 72C are formed. One or more non-illustrated ceramic sheets exist between the coupling capacitance electrodes 74A to 74E and the coupling capacitance electrodes 72. The coupling capacitance electrode 74A is connected to the via electrode portion 20A provided in the resonator 11A. The coupling capacitance electrode 74B is connected to the via electrode portion 20E provided in the resonator 11E. The coupling capacitance electrode 74C is connected to the via electrode portion 20B provided in the resonator 11B. The coupling capacitance electrode 74D is connected to the via electrode portion 20D provided in the resonator 11D. The coupling capacitance electrode 74E is connected to the via electrode portion 20C provided in the resonator 11C. Hereinafter, when the individual coupling capacitance electrodes 74A to 74E are described without distinguishing therebetween, the reference numeral 74 will be used.

The coupling capacitance electrodes 74 are formed in point symmetry, with the center C of the dielectric substrate 14 as viewed in plan serving as the center of symmetry. The coupling capacitance electrode 74A and the coupling capacitance electrode 74B are formed in point symmetry, with the center C of the dielectric substrate 14 as viewed in plan serving as the center of symmetry. The coupling capacitance electrode 74C and the coupling capacitance electrode 74D are formed in point symmetry, with the center C of the dielectric substrate 14 as viewed in plan serving as the center of symmetry. The coupling capacitance electrode 74E is formed in point symmetry, with the center C of the dielectric substrate 14 as viewed in plan serving as the center of symmetry. In the present embodiment, the feature in which the coupling capacitance electrodes 74 are formed in point symmetry is in order to obtain satisfactory frequency characteristics.

As shown in FIG. 12 and FIG. 13, a coupling pattern 78 is formed within the dielectric substrate 14. The layer in which the coupling pattern 78 is formed is positioned upwardly of the layer in which the coupling capacitance electrodes 74A to 74E are formed. One or more non-illustrated ceramic sheets exist between the coupling capacitance electrodes 74 and the coupling pattern 78. The coupling pattern 78 includes partial patterns 781 to 783. The partial patterns 781 to 783 are formed in the same layer. Stated otherwise, the partial patterns 781 to 783 are formed on the same ceramic sheet (not shown). The partial pattern 781 is positioned between the partial pattern 782 and the partial pattern 783 in the X direction. A part of the partial pattern 781 is positioned between the partial electrode portion 20Ca and the partial electrode portion 20Cb. The partial pattern 782 is connected to the via electrode portion 20A that is provided in the resonator 11A. The partial pattern 782 is formed at a position in the −X direction with respect to the partial pattern 781. The partial pattern 781 and the partial pattern 782 are spaced apart from each other in the X direction. The partial pattern 783 is connected to the via electrode portion 20E that is provided in the resonator 11E. The partial pattern 783 is formed at a position in the +X direction with respect to the partial pattern 781. The partial pattern 781 and the partial pattern 783 are spaced apart from each other in the X direction.

The partial pattern 781 is formed in point symmetry, with the center C of the dielectric substrate 14 as viewed in plan serving as the center of symmetry. The partial pattern 782 and the partial pattern 783 are formed in point symmetry, with the center C of the dielectric substrate 14 as viewed in plan serving as the center of symmetry. More specifically, the coupling pattern 78 is formed in point symmetry, with the center C of the dielectric substrate 14 as viewed in plan serving as the center of symmetry. In the present embodiment, the feature in which the coupling pattern 78 is formed in point symmetry is in order to obtain satisfactory frequency characteristics.

As shown in FIG. 14 and FIG. 15, a coupling pattern 76 is formed within the dielectric substrate 14. The layer in which the coupling pattern 76 is formed is positioned upwardly of the layer in which the coupling pattern 78 is formed. One or more non-illustrated ceramic sheets exist between the coupling pattern 78 and the coupling pattern 76. The coupling pattern 76 is connected to the via electrode portion 20B that is provided in the resonator 11B, and the via electrode portion 20D that is provided in the resonator 11D. Openings 76*a* and 76*b* are formed in the coupling pattern 76. The partial electrode portion 20Ca provided in the resonator 11C penetrates through the opening 76*a*. The partial electrode portion 20Cb provided in the resonator 11C penetrates through the opening 76*b*. Moreover, it should be noted that the number of openings formed in the coupling pattern 76 is not limited to two. Together with one opening being formed in the coupling pattern 76, the partial electrode portion 20Ca and the partial electrode portion 20Cb may penetrate through such an opening.

The coupling pattern 76 is formed in point symmetry, with the center C of the dielectric substrate 14 as viewed in plan serving as the center of symmetry. In the present embodiment, the feature in which the coupling pattern 76 is formed in point symmetry is in order to obtain satisfactory frequency characteristics.

As shown in FIG. 2, input/output patterns 80A and 80B are further formed within the dielectric substrate 14. The input/output patterns 80A and 80B are formed in the same layer. Stated otherwise, the input/output patterns 80A and 80B are formed on the same ceramic sheet (not shown). The layer in which the input/output patterns 80A and 80B are formed is positioned upwardly with respect to the layer in which the coupling pattern 76 is formed. One or more non-illustrated ceramic sheets exist between the coupling pattern 78 and the input/output patterns 80A and 80B. Hereinafter, when the individual input/output patterns 80A and 80B are described without distinguishing therebetween, the reference numeral 80 will be used.

The input/output pattern 80A includes partial patterns 80A1 and 80A2. One end of the partial pattern 80A1 is connected to the input/output terminal 22A. Another end of the partial pattern 80A1 is connected to the partial pattern 80A2. The partial pattern 80A2 is connected to the via electrode portion 20A. In this manner, the input/output terminal 22A is connected to the via electrode portion 20A via the input/output pattern 80A.

The input/output pattern 80B includes partial patterns 80B1 and 80B2. One end of the partial pattern 80B1 is connected to the input/output terminal 22B. Another end of the partial pattern 80B1 is connected to the partial pattern 80B2. The partial pattern 80B2 is connected to the via electrode portion 20E. In this manner, the input/output terminal 22B is connected to the via electrode portion 20E via the input/output pattern 80B.

In this manner, the input/output terminal 22A is electrically connected to the via electrode portion 20A via the input/output pattern 80A, and the input/output terminal 22B is electrically connected to the via electrode portion 20E via the input/output pattern 80B. According to the present embodiment, the external Q can be adjusted appropriately by appropriately setting the positions in the Z direction of the input/output patterns 80A and 80B. Specifically, according to the present embodiment, the external Q can be appropriately adjusted by appropriately setting the positions of the input/output patterns 80A and 80B in the longitudinal direction of the via electrode portions 20A and 20D.

As shown in FIG. 7, shielding via electrode portions 81A to 81D are formed in the dielectric substrate 14. When the individual shielding via electrode portions are described without distinguishing therebetween, the reference numeral 81 will be used, and when the individual shielding via electrode portions are described while distinguishing therebetween, the reference numerals 81A, 81B, 81C, and 81D will be used.

A shielding via electrode 82A is provided on the shielding via electrode portion 81A. A shielding via electrode 82B is provided on the shielding via electrode portion 81B. A shielding via electrode 82C is provided on the shielding via electrode portion 81C. A shielding via electrode 82D is provided on the shielding via electrode portion 81D. When the individual shielding via electrodes are described without distinguishing therebetween, the reference numeral 82 will be used, and when the individual shielding via electrodes are described while distinguishing therebetween, the reference numerals 82A to 82D will be used. In the example shown in FIG. 1, one of the shielding via electrodes 82 is provided in one of the shielding via electrode portions 81. However, a plurality of the shielding via electrodes 82 may be provided in one of the shielding via electrode portions 81. Further, at least one of the plurality of shielding via electrode portions 81, if necessary, may be appropriately omitted.

Ends of the shielding via electrode portions 81 are connected to the shielding conductor 12A. Other ends of the shielding via electrode portions 81 are connected to the shielding conductor 12B.

As shown in FIG. 11, the shielding via electrode portion 81A is connected to the shielding conductors 12A and 12B, within an extending region 84A in which the region in which the via electrode portion 20A is positioned is extended in the −Y direction. Specifically, the shielding via electrode portion 81A is connected to the shielding conductors 12A and 12B, within the extending region 84A in which the region in which the via electrode portion 20A is positioned is extended toward the shielding conductor 12Ca. In this manner, the shielding via electrode portion 81A is selectively formed within the extending region 84A. The shielding via electrode portion 81A is positioned in the vicinity of the shielding conductor 12Ca. Moreover, the region in which the via electrode portions 20 are positioned corresponds to the imaginary circle 26. Further, the shielding via electrode portion 81A is connected to the electrode pattern 19*a*.

The shielding via electrode portion 81B is connected to the shielding conductors 12A and 12B, within an extending region 84B in which the region in which the via electrode portion 20E is positioned is extended in the +Y direction. Specifically, the shielding via electrode portion 81B is connected to the shielding conductors 12A and 12B, within the extending region 84B in which the region in which the via electrode portion 20E is positioned is extended toward the shielding conductor 12Cb. The shielding via electrode portion 81B is selectively formed within the extending region 84B. The shielding via electrode portion 81B is positioned in the vicinity of the shielding conductor 12Cb. Further, the shielding via electrode portion 81B is connected to the electrode pattern 19*b*.

The shielding via electrode portion 81C is connected to the shielding conductors 12A and 12B, within an extending region 84C in which the region in which the via electrode portion 20B is positioned is extended in the +Y direction. Specifically, the shielding via electrode portion 81C is connected to the shielding conductors 12A and 12B, within an extending region 84C in which the region in which the via electrode portion 20B is positioned is extended toward the shielding conductor 12Cb. In this manner, the shielding via electrode portion 81C is selectively formed within the extending region 84C. The shielding via electrode portion 81C is positioned in the vicinity of the shielding conductor 12Cb. Further, the shielding via electrode portion 81C is connected to the electrode pattern 19*c*.

The shielding via electrode portion 81D is connected to the shielding conductors 12A and 12B, within an extending region 84D in which the region in which the via electrode portion 20D is positioned is extended in the −Y direction. Specifically, the shielding via electrode portion 81D is connected to the shielding conductors 12A and 12B, within the extending region 84D in which the region in which the via electrode portion 20D is positioned is extended toward the shielding conductor 12Ca. In this manner, the shielding via electrode portion 81D is selectively formed within the extending region 84D. The shielding via electrode portion 81D is positioned in the vicinity of the shielding conductor 12Ca. Further, the shielding via electrode portion 81D is connected to the electrode pattern 19*d*.

In the following description, when the individual extending regions are described without distinguishing therebetween, the reference numeral 84 will be used, and when the individual extending regions are described while distinguishing therebetween, the reference numerals 84A to 84D will be used. In the present embodiment, the shielding via electrode portions 81 are formed for the following reason. Specifically, when a positional shifting occurs when the dielectric substrate 14 is cut, the distance between the via electrode portions 20 and the side surfaces 14*e* and 14*f* varies. When the distance between the via electrode portions 20 and the side surfaces 14*e* and 14*f* varies, the distance between the via electrode portions 20 and the shielding conductors 12Ca and 12Cb also varies. Such a variation in the distance between the via electrode portions 20 and the shielding conductors 12Ca and 12Cb brings about a variation in the filter characteristics and the like. On the other hand, since the shielding via electrode portions 81 are not formed on the side surfaces 14*e* and 14*f*, they do not receive an influence of any positional shifting that occurs when the dielectric substrate 14 is cut. Specifically, even in the case that a positional shifting occurs when the dielectric substrate 14 is cut, the distance between the shielding via electrode portions 81 and the via electrode portions 20 does not change. Due to such a reason, according to the present embodiment, the shielding via electrode portions 81 are formed.

In the present embodiment, the shielding via electrode portions 81 are selectively formed within the extending regions 84 for the following reason. Specifically, the shielding via electrode portions 81 can be formed by forming the via holes by irradiating the dielectric substrate 14 with a laser beam, and then by filling the via holes with a conductor. More specifically, a certain amount of man-hours are required in order to form the shielding via electrode portions 81. For this reason, when a large number of the shielding via electrode portions 81 are simply arranged along the side surfaces 14*e* and 14*f*, satisfactory productivity cannot be obtained. On the other hand, by simply arranging the shielding via electrode portions 81 only in the extending regions 84, it is possible to suppress variations in the filter characteristics and the like caused by the occurrence of positional shifting when the dielectric substrate 14 is cut. Due to such a reason, according to the present embodiment, the shielding via electrode portions 81 are selectively formed within the extending regions 84.

In this manner, according to the present embodiment, since the coupling capacitance electrodes 98, which are printed together with the capacitor electrodes 18, are provided between the capacitor electrodes 19 and the shielding conductor 12A, in the case that the dimension of the capacitor electrodes 18 is increased, the dimension of the coupling capacitance electrodes 98 positioned between the capacitor electrodes 19 and the shielding conductor 12A also increases in a similar manner. Therefore, in the case that the capacitance between the capacitor electrodes 18 and the shielding conductor 12A has increased due to an increase in the dimension of the capacitor electrodes 18, the coupling capacitance between the capacitor electrodes 19 and the coupling capacitance electrodes 98 also increases due to an increase in the dimension of the coupling capacitance electrodes 98. More specifically, according to the present embodiment, in the case that the capacitance between the capacitor electrodes 18 and the shielding conductor 12A increases, not only the capacitance between the capacitor electrodes 18 and the shielding conductor 12A, but also the coupling capacitance between the capacitor electrodes 19 and the coupling capacitance electrodes 98 increases. Therefore, according to the present embodiment, even in the case that a dimensional error or the like occurs when forming the capacitor electrodes 18, a deterioration of the filter characteristics can be suppressed.

Second Embodiment

Figure 18:
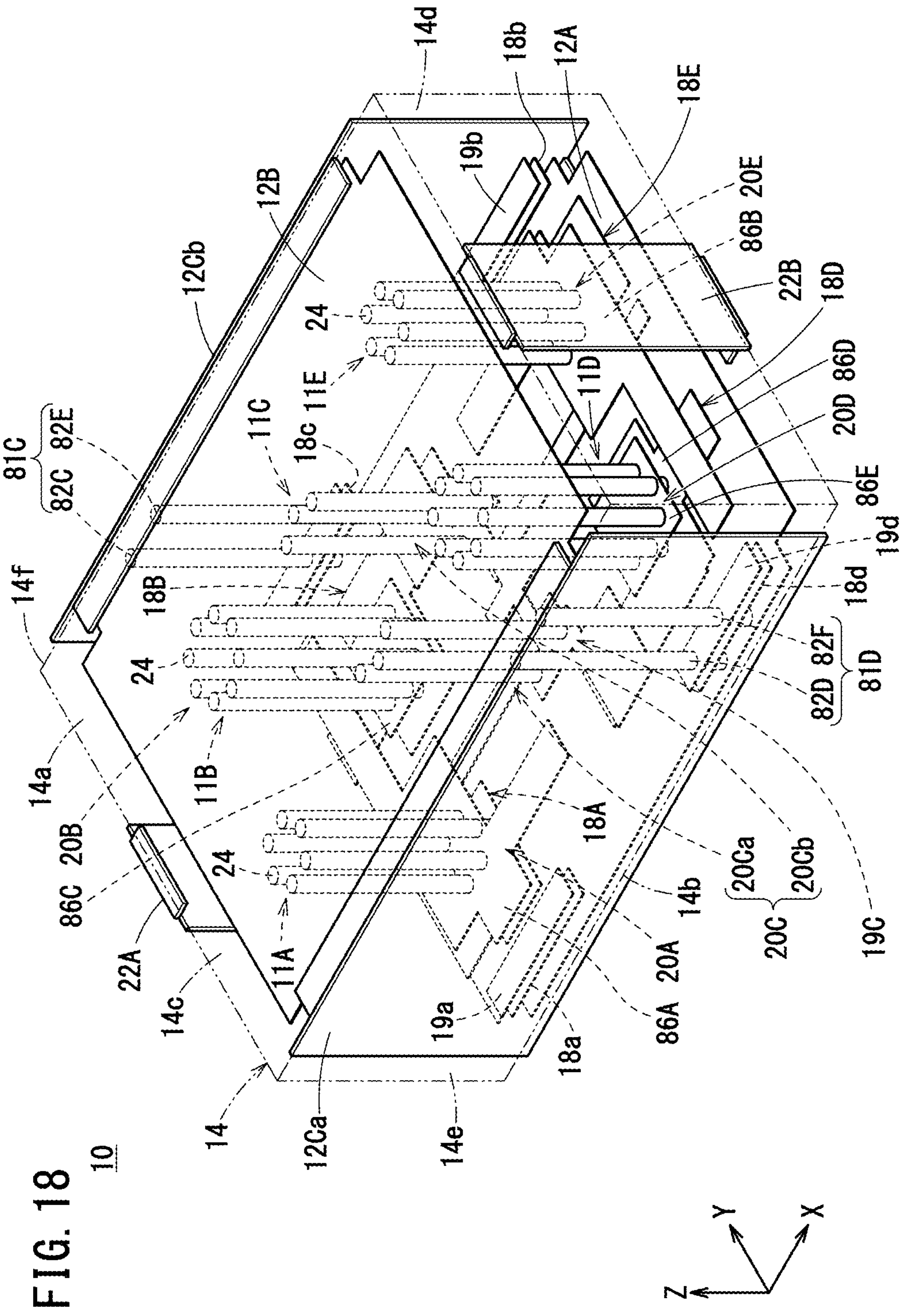
FIG. 18 is a perspective view showing the filter according to a second embodiment.
Figure 19:
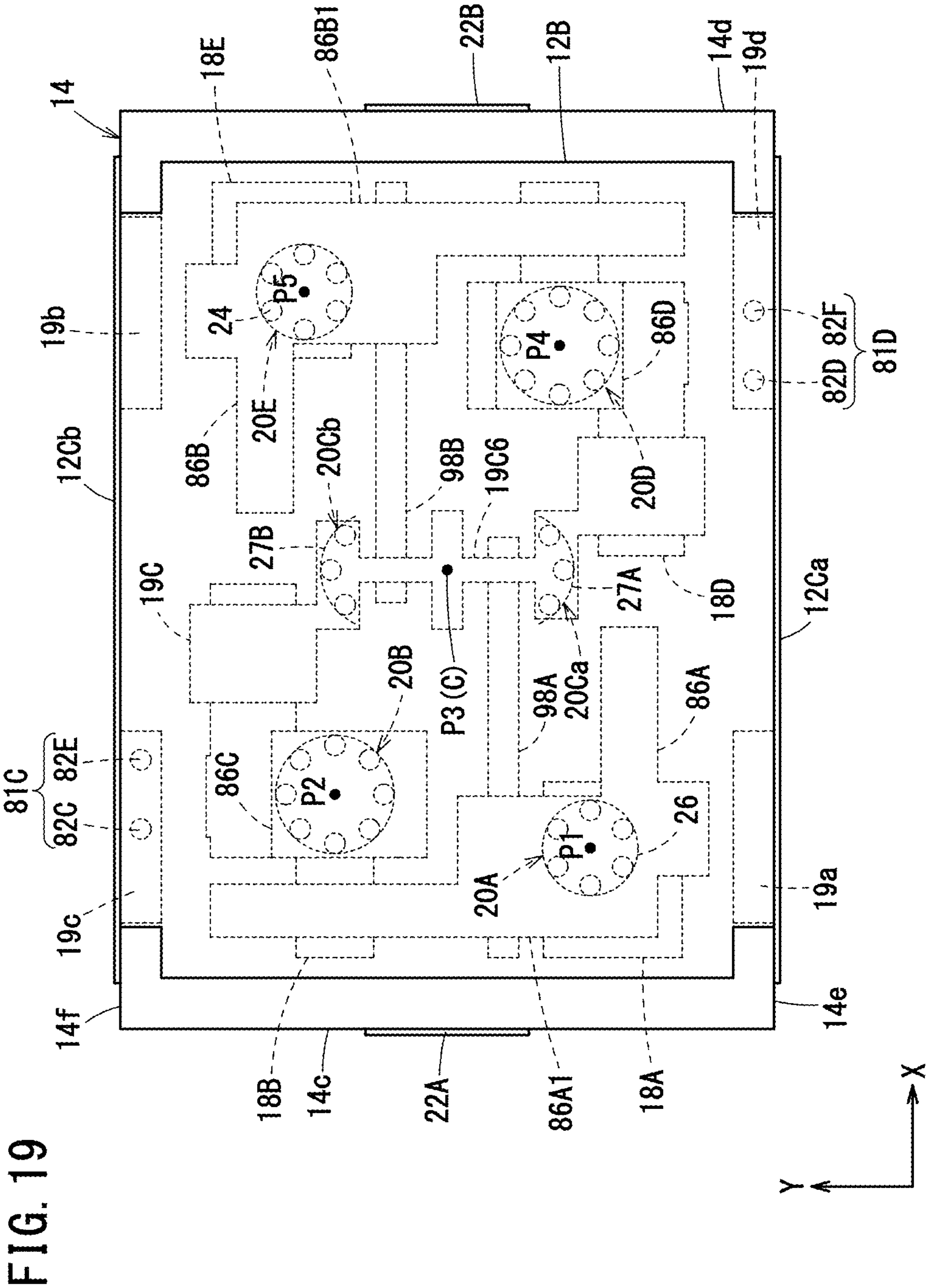
FIG. 19 is a plan view showing the filter according to the second embodiment.
Figure 20A:
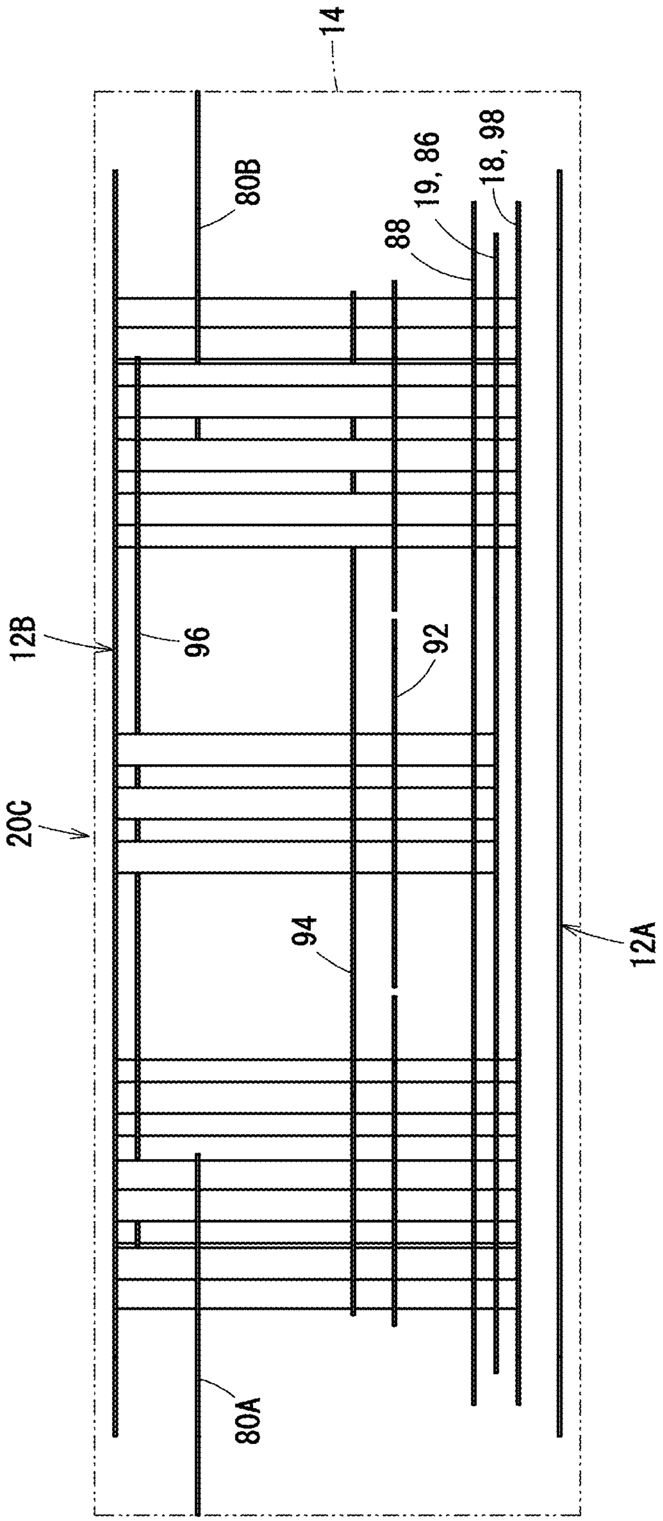
FIG. 20A is a cross-sectional view showing a part of the filter according to the second embodiment.
Figure 20B:
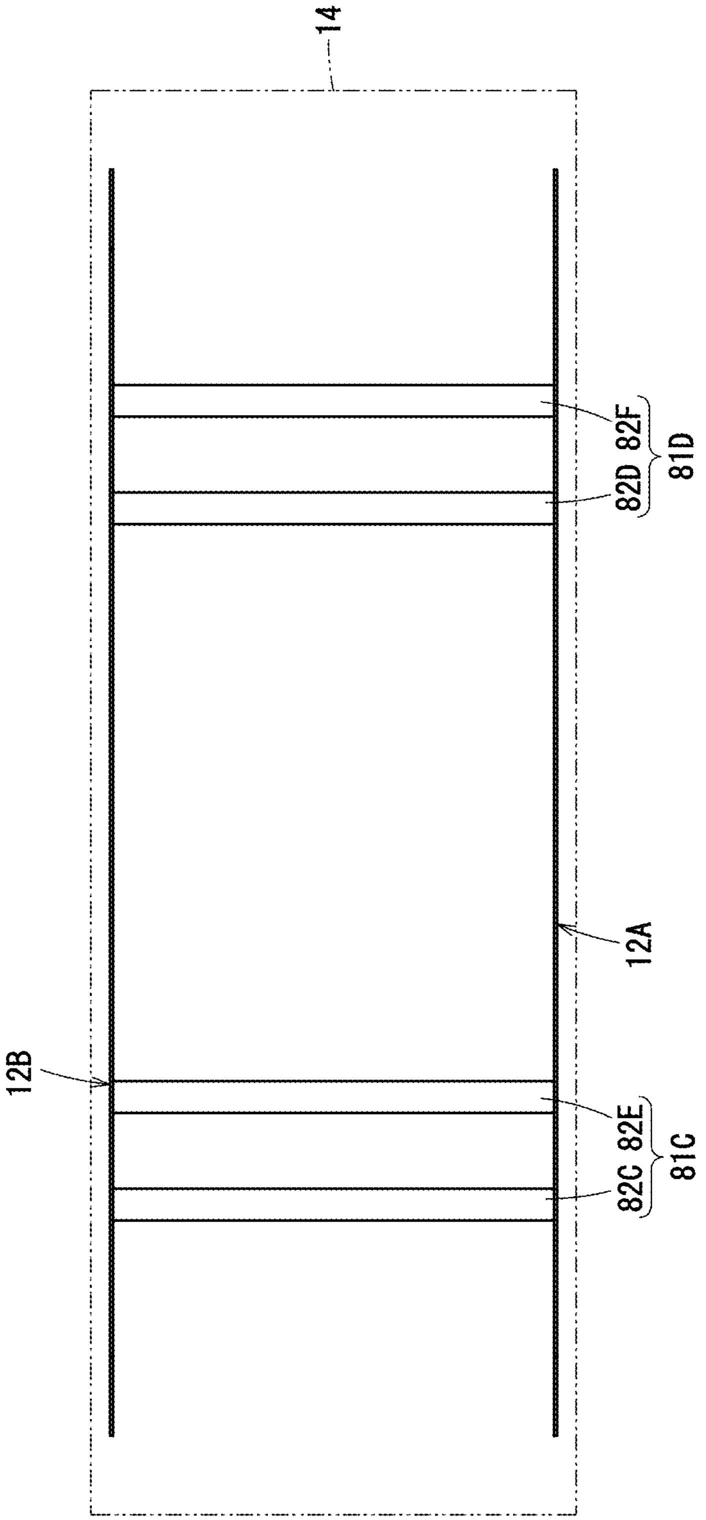
FIG. 20B is a cross-sectional view showing a part of the filter according to the second embodiment.
Figure 21:
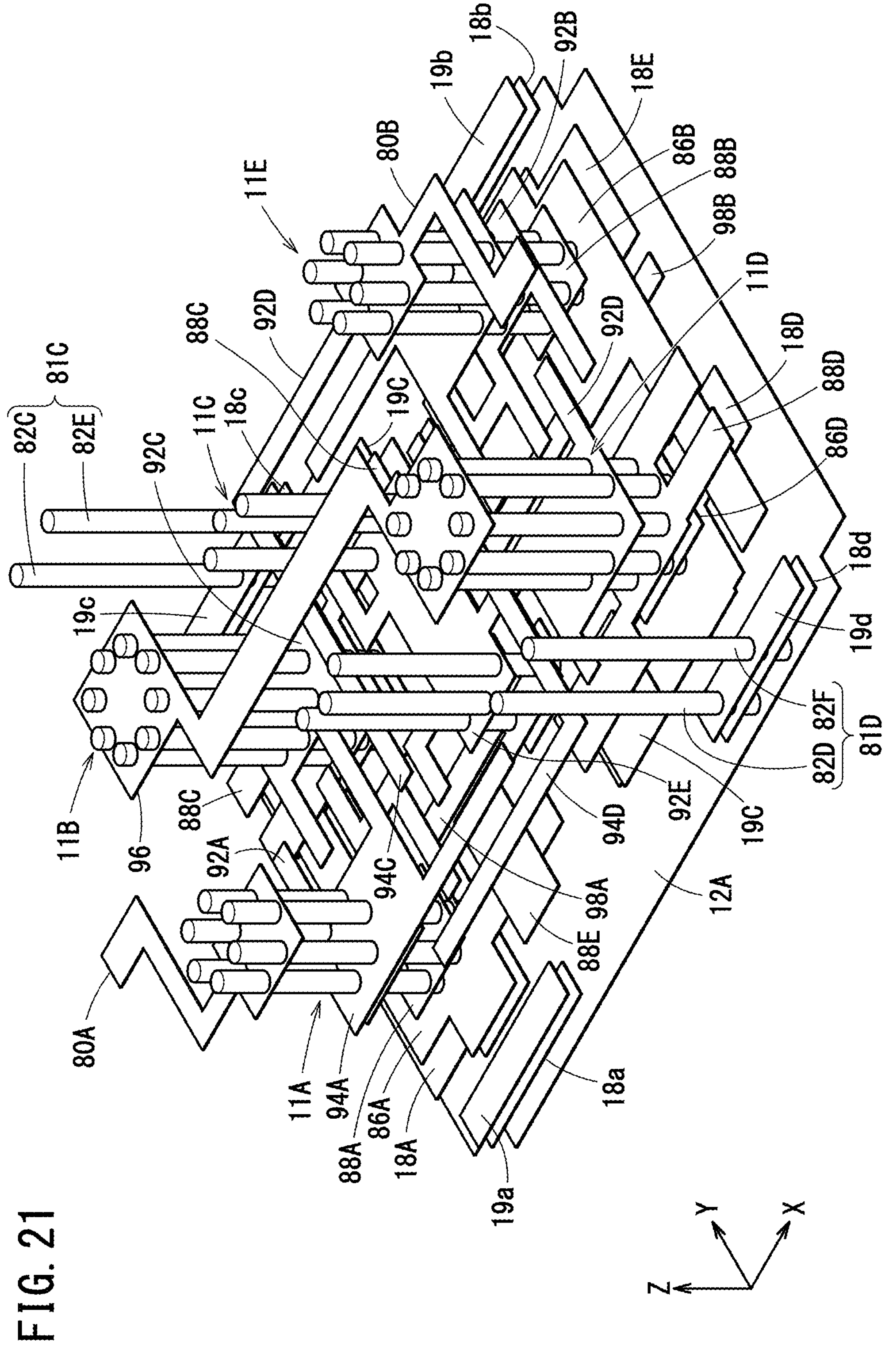
FIG. 21 is a perspective view showing the filter according to the second embodiment.
Figure 22:
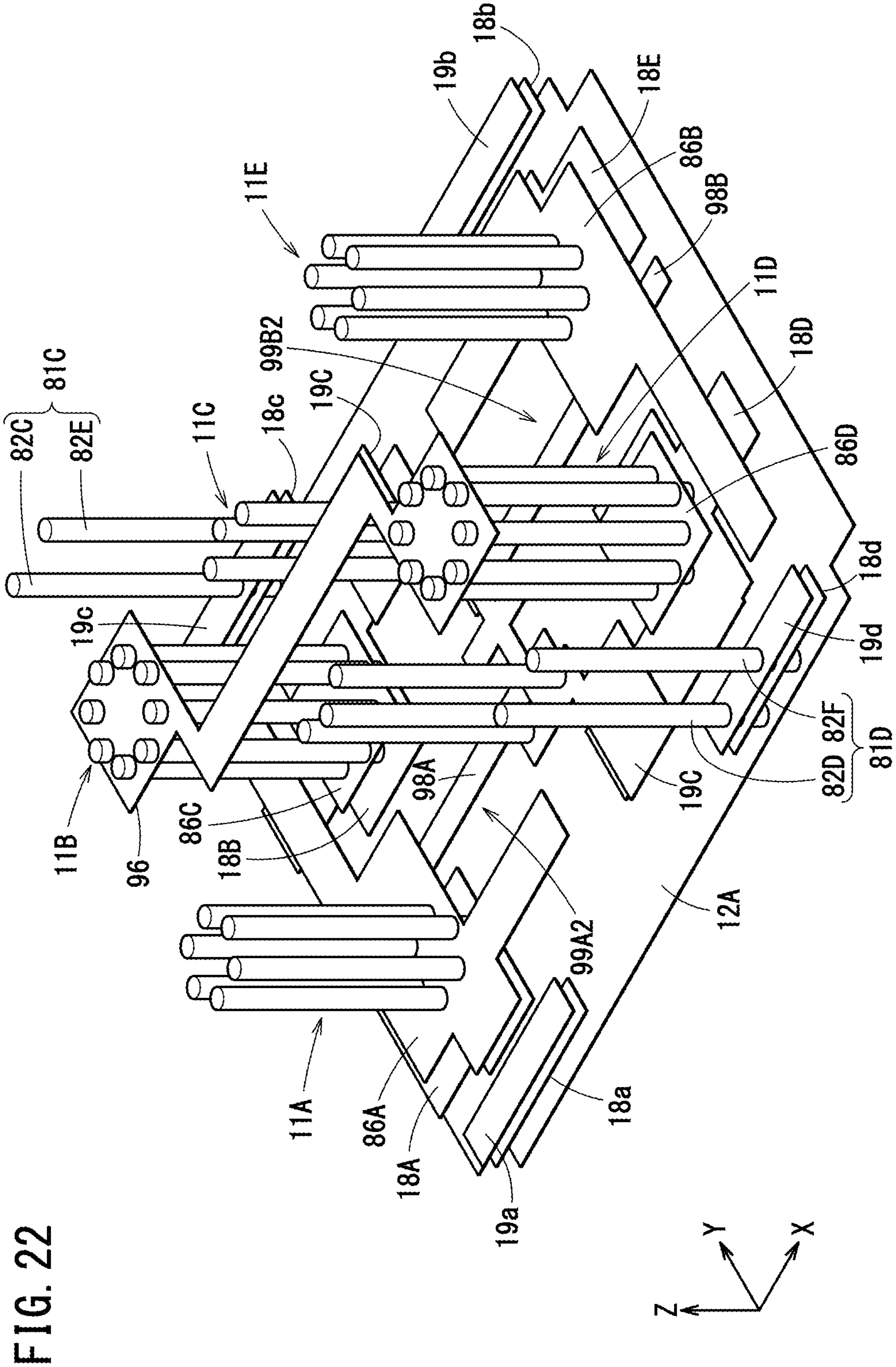
FIG. 22 is a perspective view showing the filter according to the second embodiment.
Figure 23:
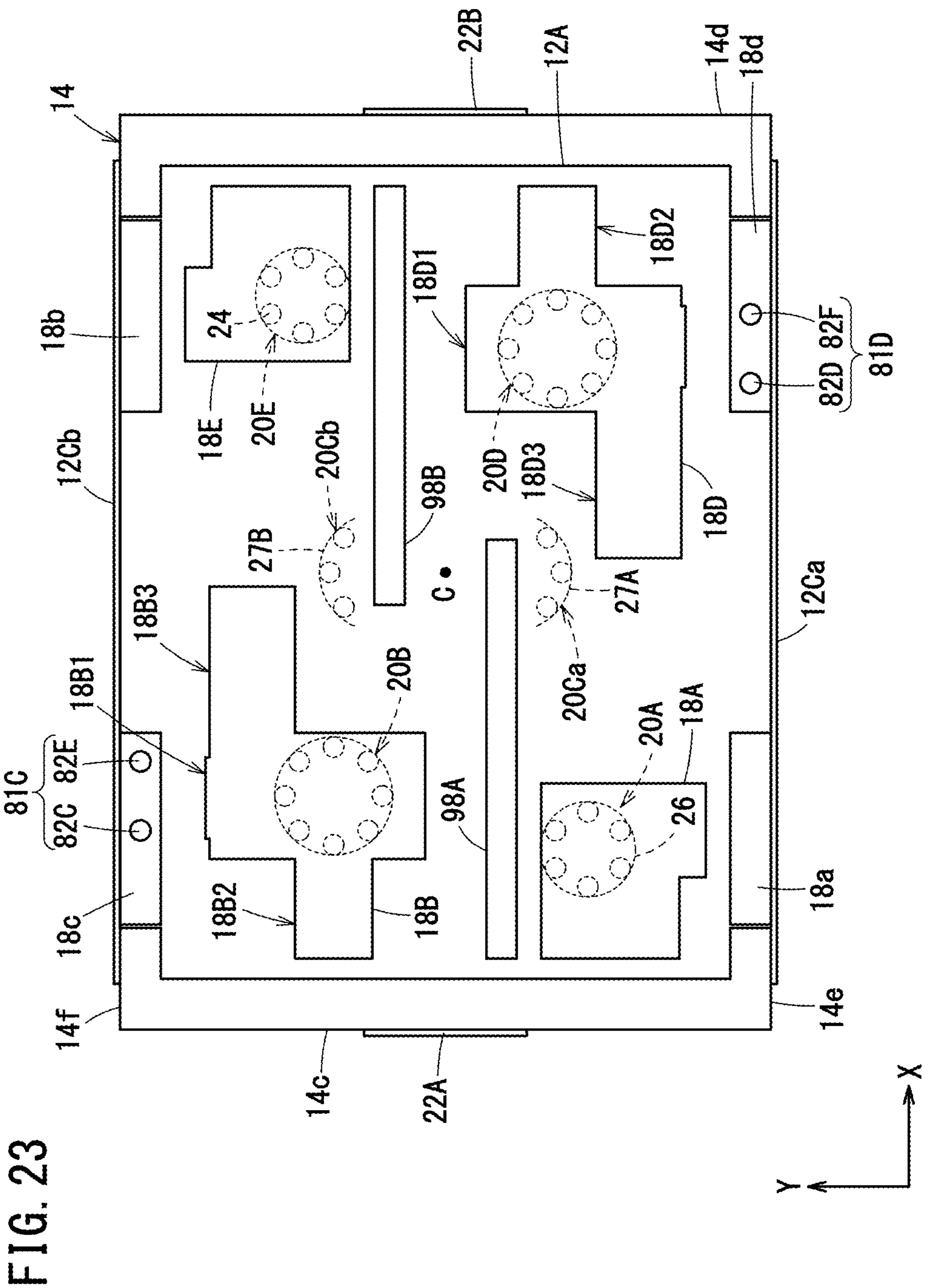
FIG. 23 is a plan view showing the filter according to the second embodiment.
Figure 24:
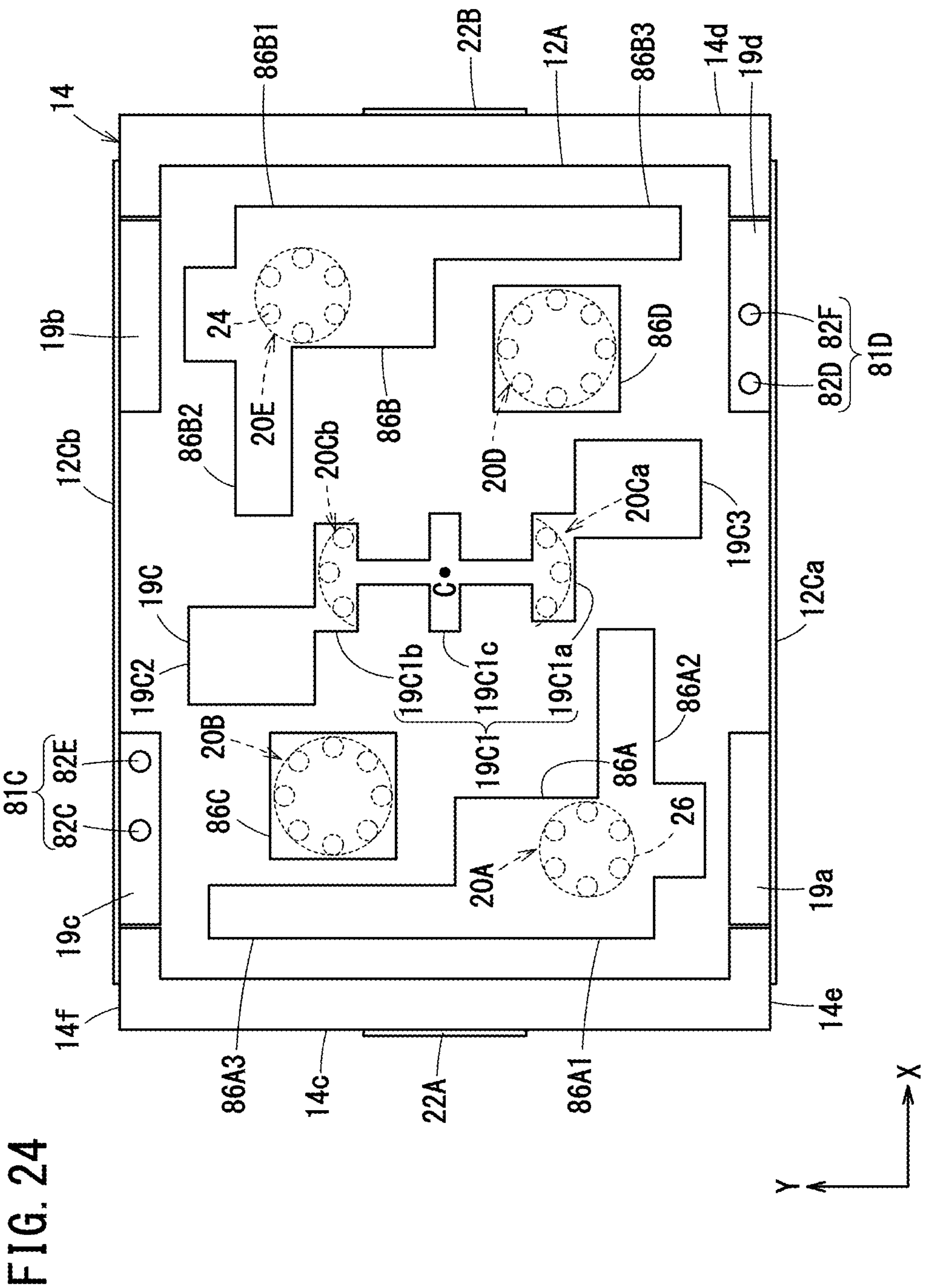
FIG. 24 is a plan view showing the filter according to the second embodiment.
Figure 25:
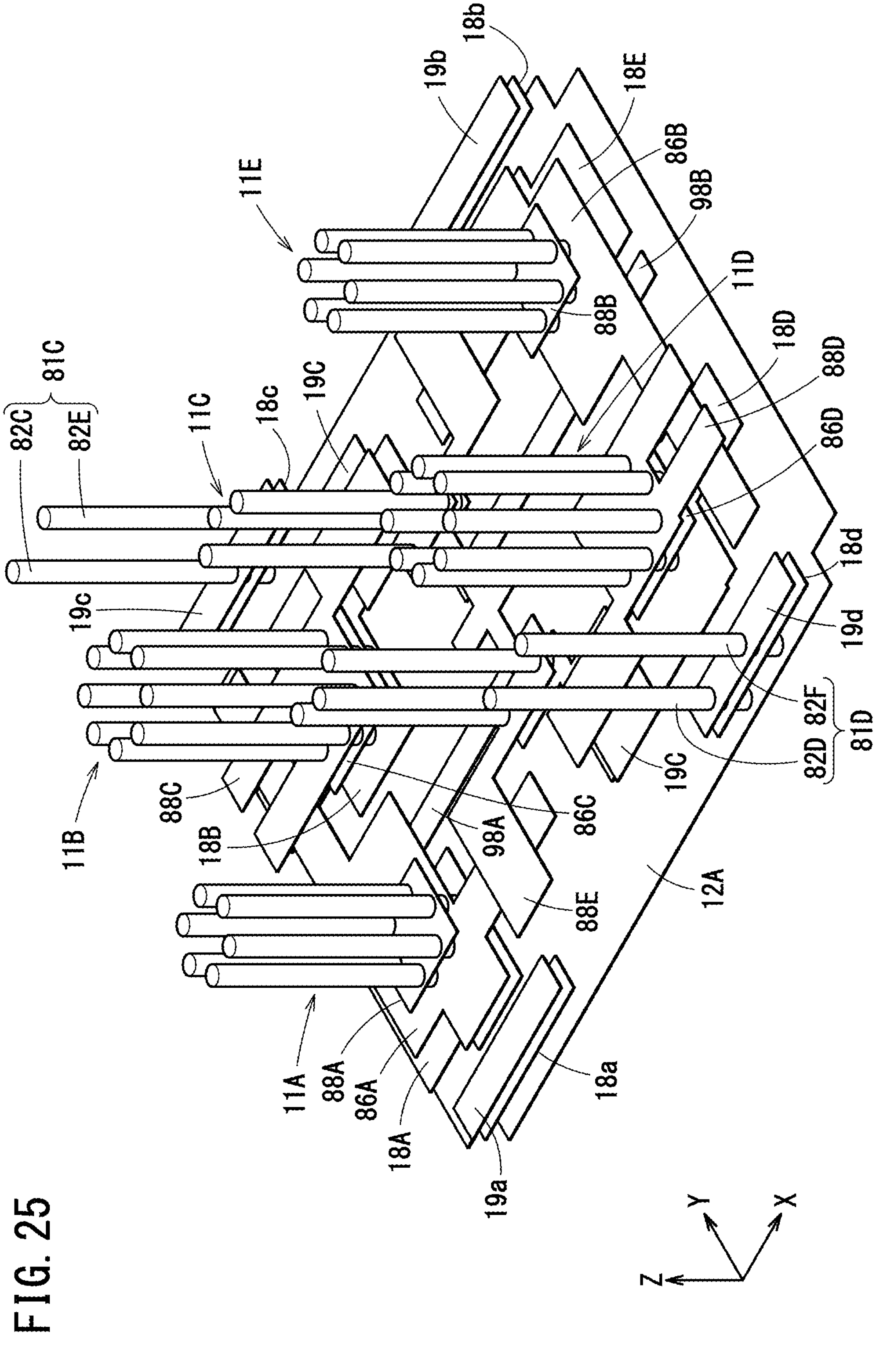
FIG. 25 is a perspective view showing the filter according to the second embodiment.
Figure 26:
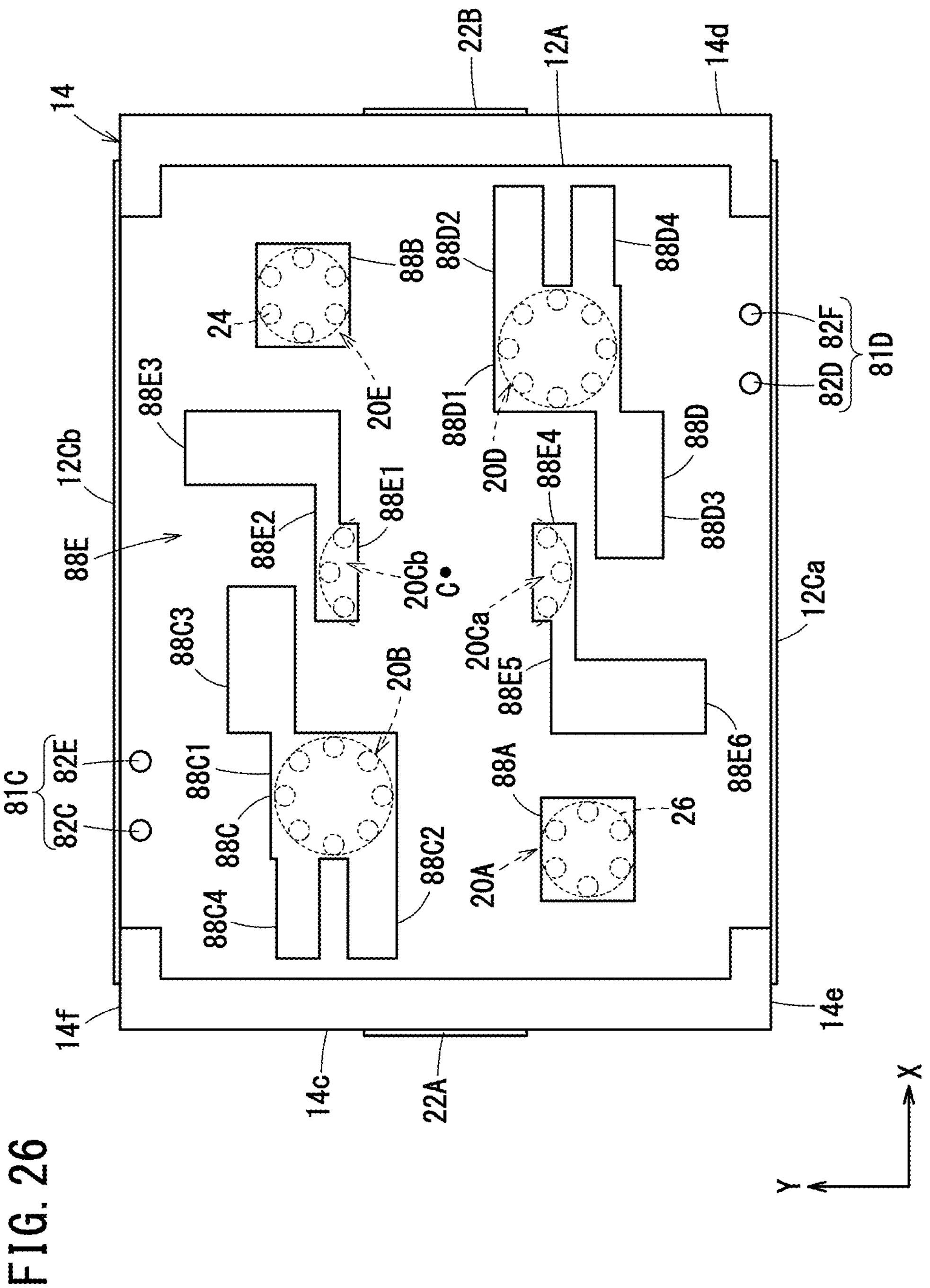
FIG. 26 is a plan view showing the filter according to the second embodiment.
Figure 27:
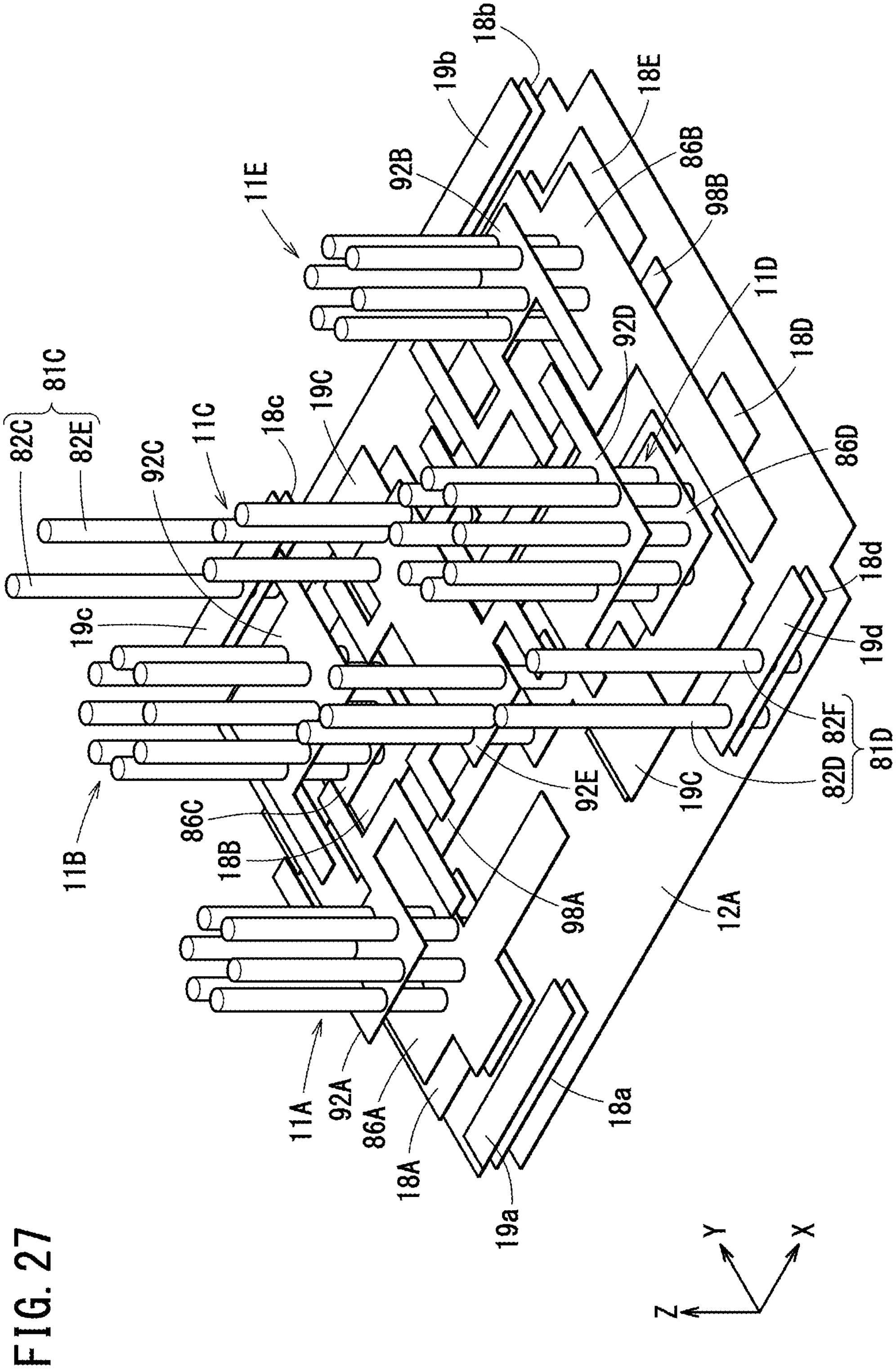
FIG. 27 is a perspective view showing the filter according to the second embodiment.
Figure 28:
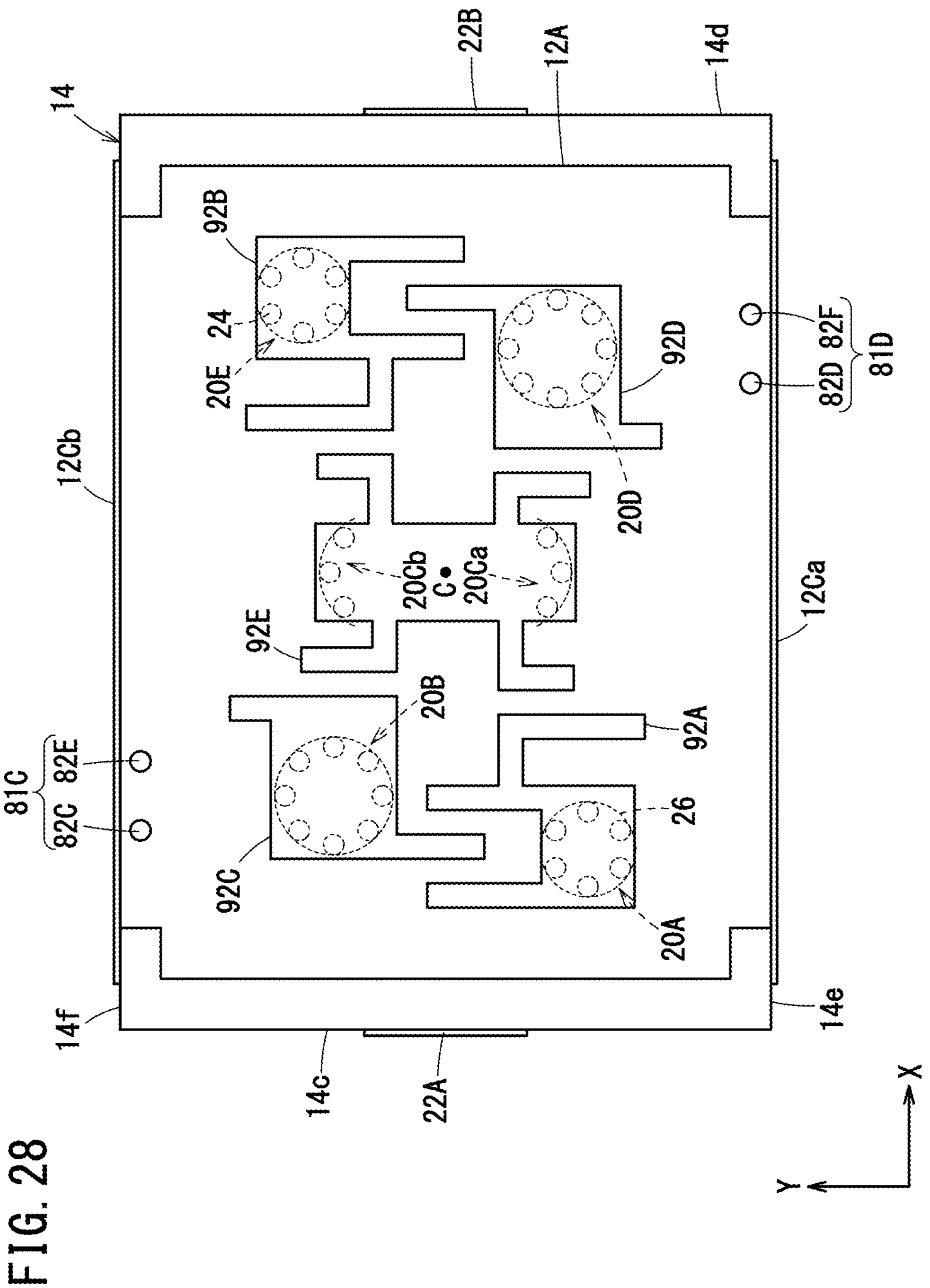
FIG. 28 is a plan view showing the filter according to the second embodiment.
Figure 29:
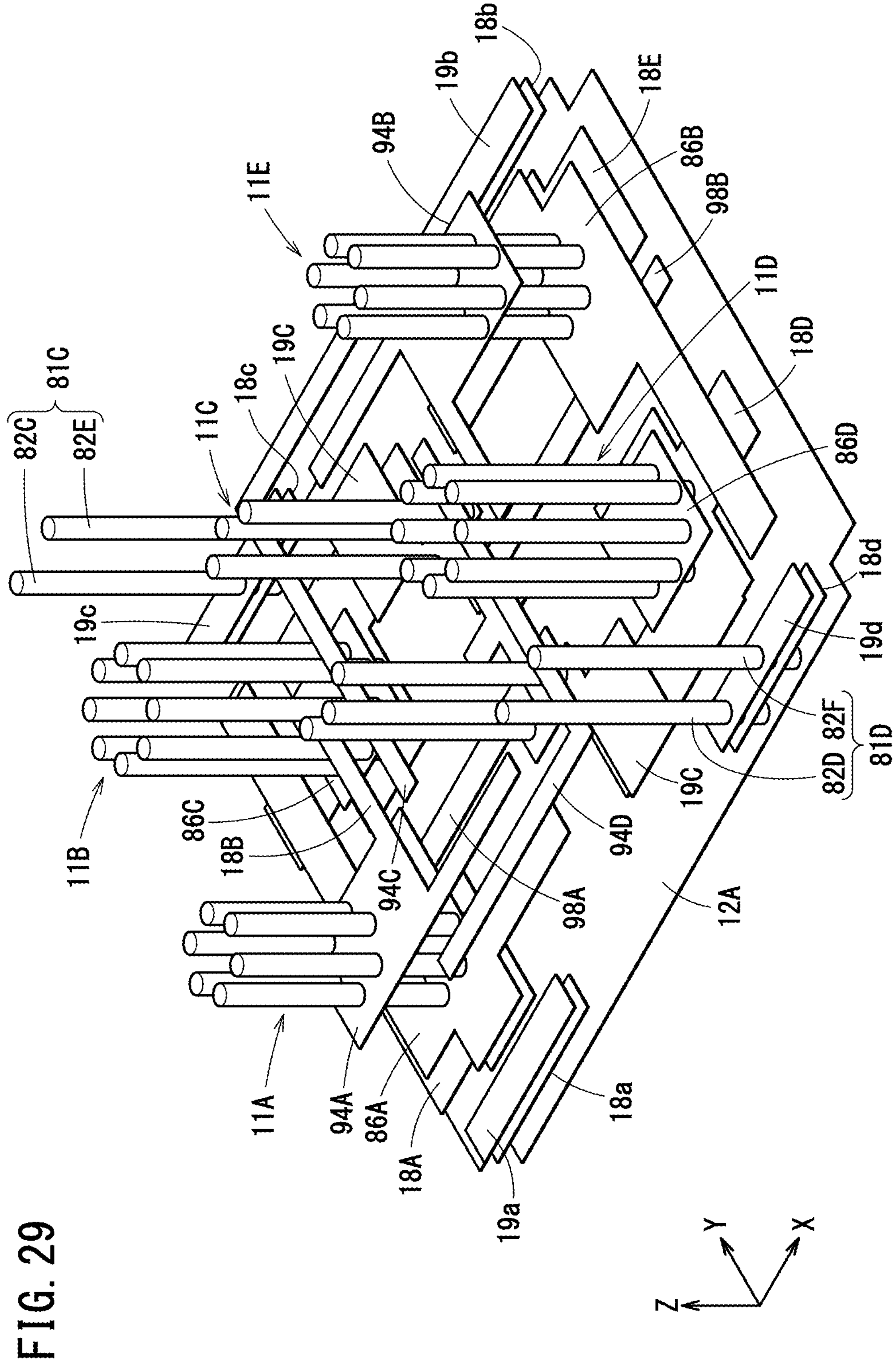
FIG. 29 is a perspective view showing the filter according to the second embodiment.
Figure 30:
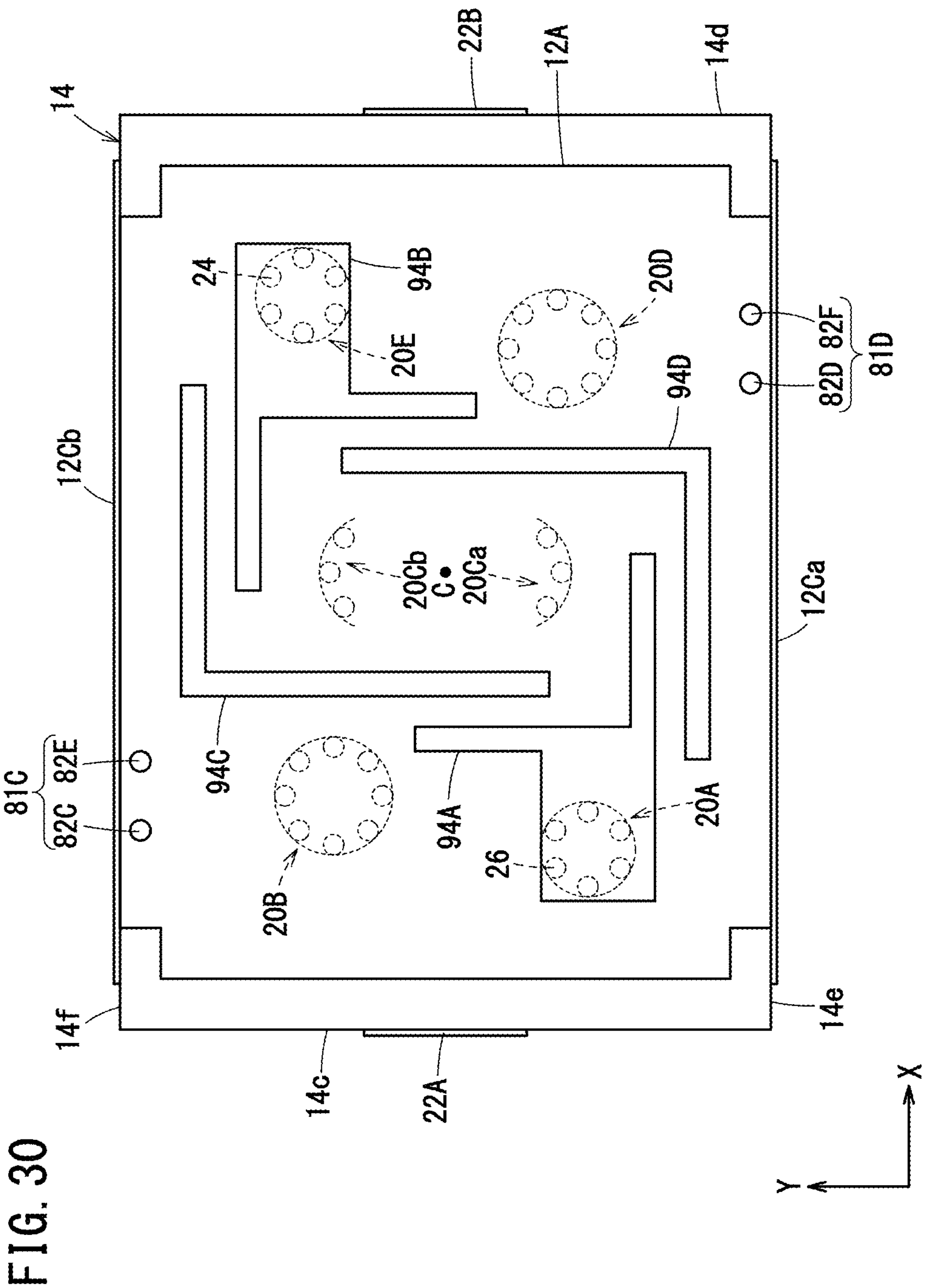
FIG. 30 is a plan view showing the filter according to the second embodiment.
Figure 31:
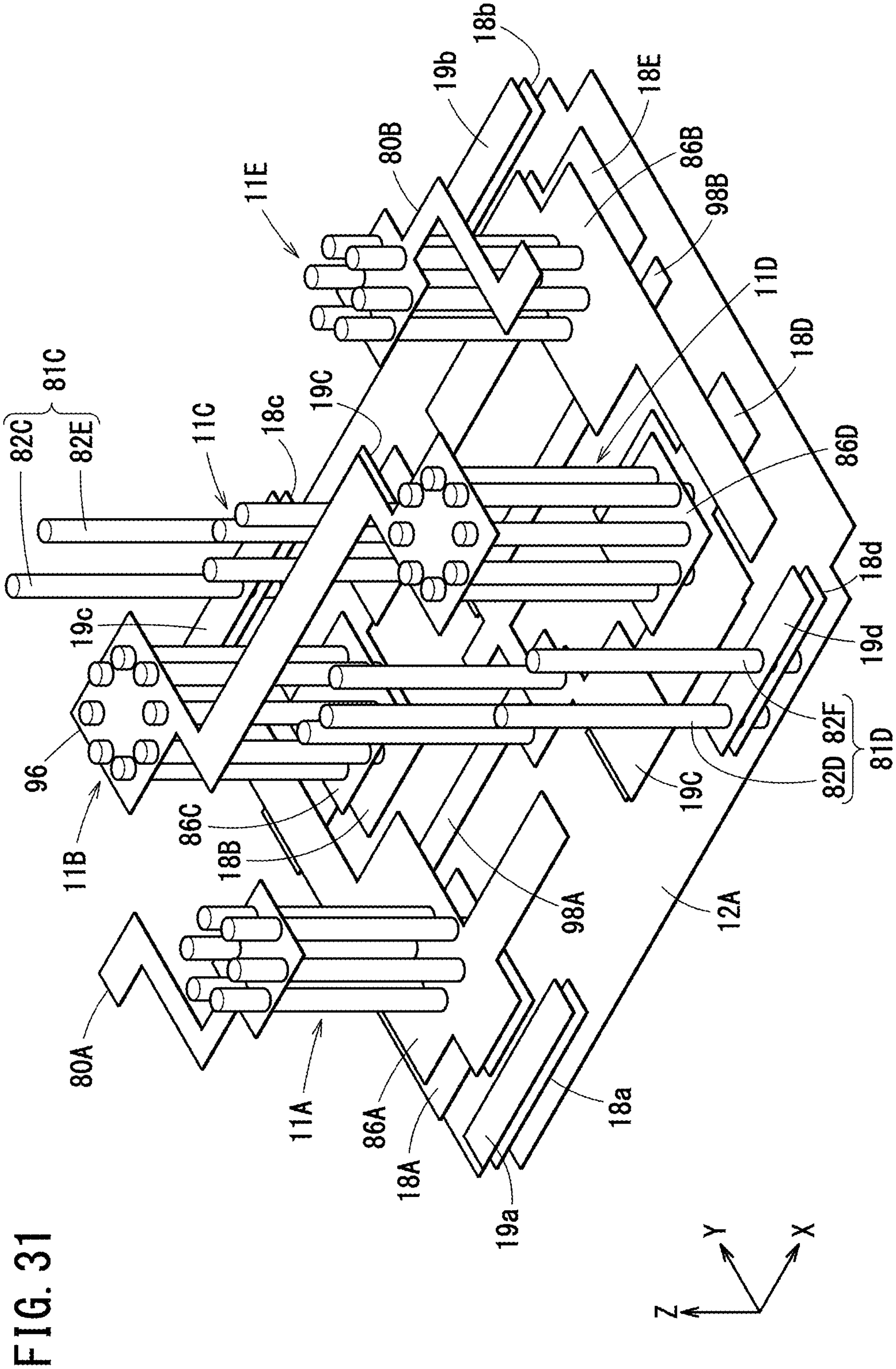
FIG. 31 is a perspective view showing the filter according to the second embodiment.
Figure 32:
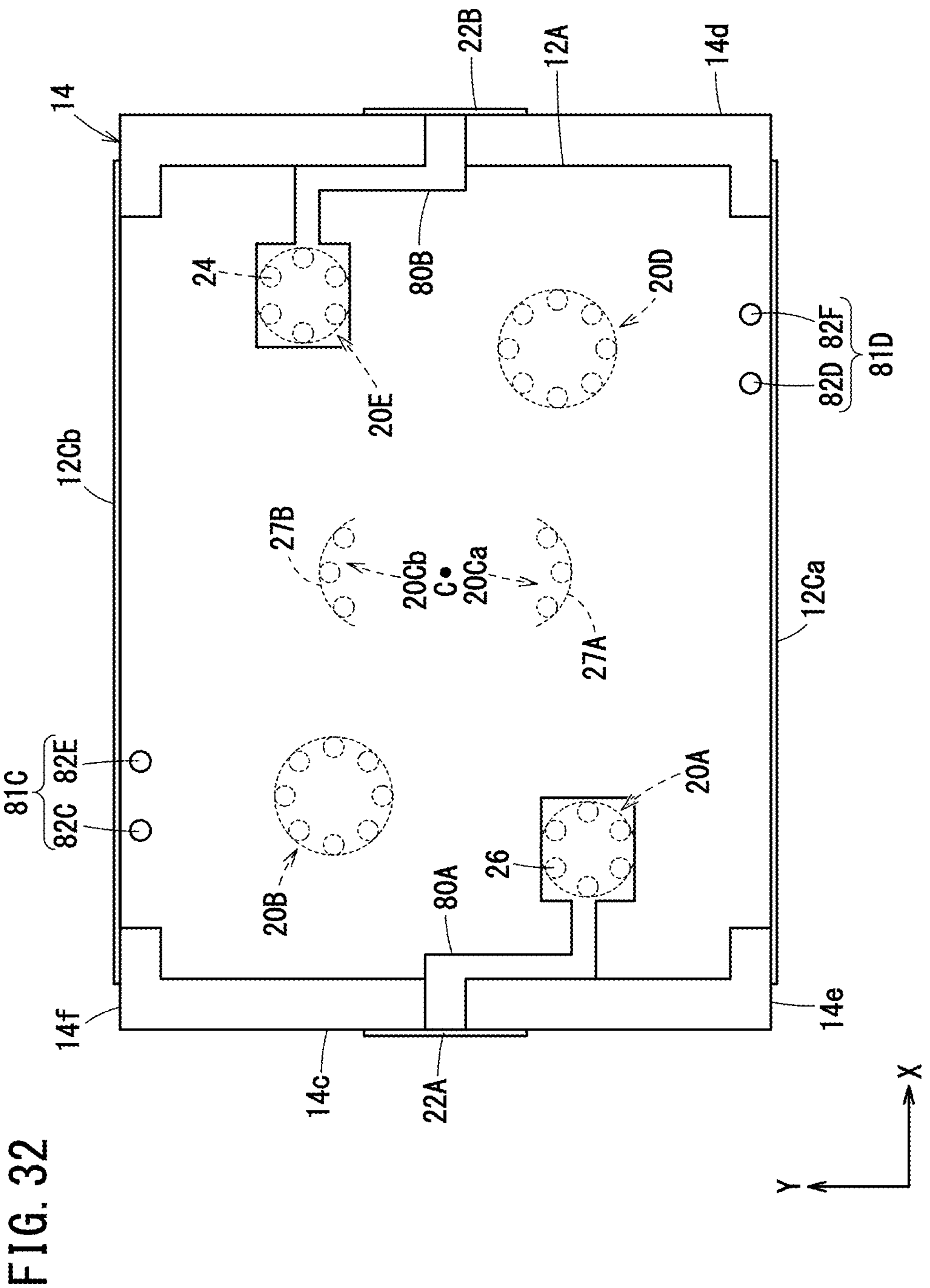
FIG. 32 is a plan view showing the filter according to the second embodiment.
Figure 33:
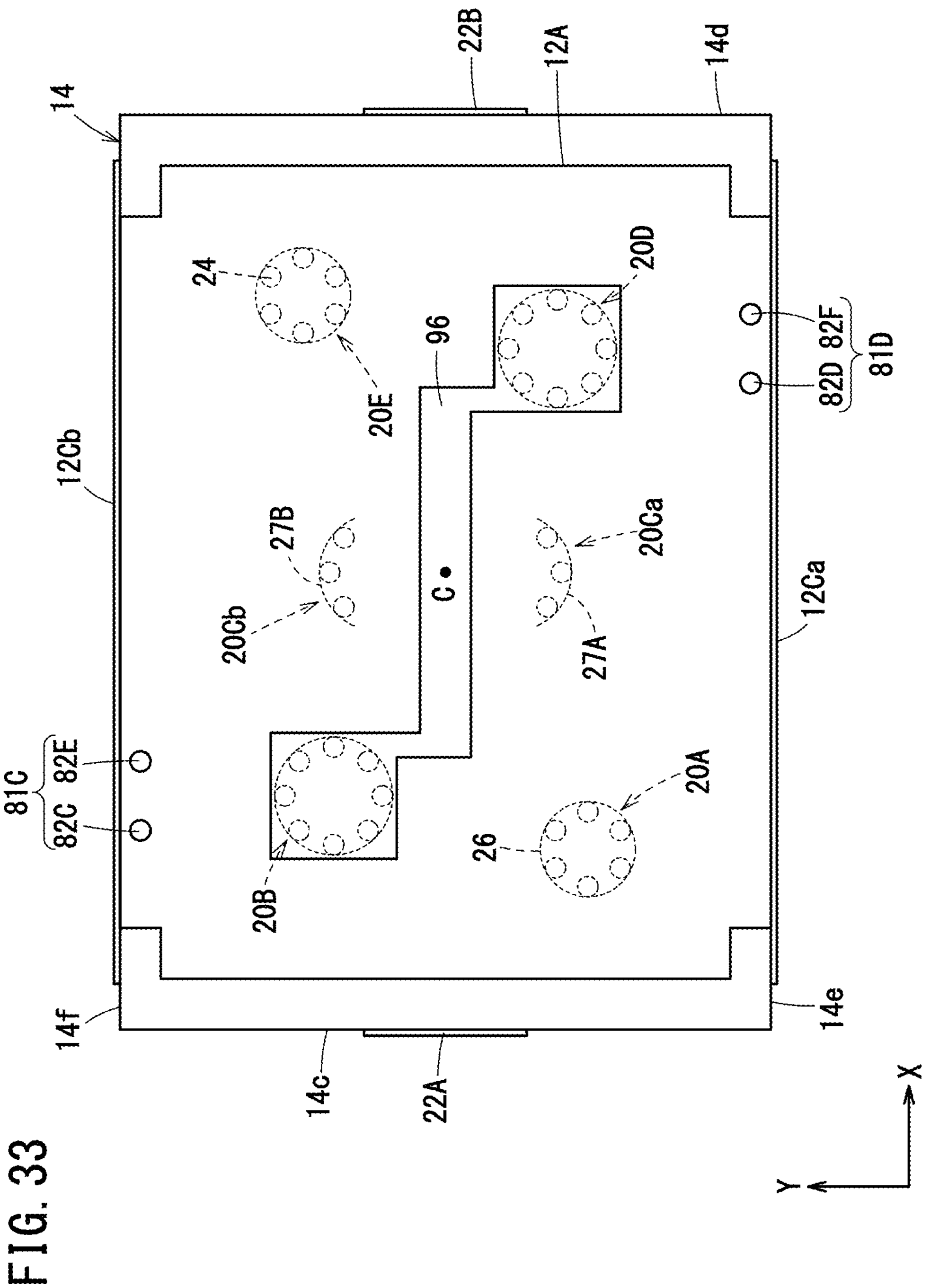
FIG. 33 is a plan view showing the filter according to the second embodiment.

A filter according to a second embodiment will be described with reference to FIG. 18 to FIG. 33. FIG. 18 is a perspective view showing the filter according to the second embodiment. FIG. 19 is a plan view showing the filter according to the second embodiment. FIG. 20A and FIG. 20B are cross-sectional views showing a part of the filter according to the second embodiment. FIG. 21 and FIG. 22 are perspective views showing the filter according to the second embodiment. FIG. 23 and FIG. 24 are plan views showing the filter according to the second embodiment. FIG. 25 is a perspective view showing the filter according to the second embodiment. FIG. 26 is a plan view showing the filter according to the second embodiment. FIG. 27 is a perspective view showing the filter according to the second embodiment. FIG. 28 is a plan view showing the filter according to the second embodiment. FIG. 29 is a perspective view showing the filter according to the second embodiment. FIG. 30 is a plan view showing the filter according to the second embodiment. FIG. 31 is a perspective view showing the filter according to the second embodiment. FIG. 32 and FIG. 33 are plan views showing the filter according to the second embodiment. For the sake of simplicity, a part of the constituent elements have been appropriately omitted from FIG. 18 to FIG. 33. The same constituent elements as those in the filter according to the first embodiment shown in FIG. 1 to FIG. 15 are denoted by the same reference numerals, and description of such features will be omitted or simplified.

As shown in FIG. 18 and FIG. 19, within the dielectric substrate 14, capacitor electrodes (strip lines) 18A, 18B, 18D, and 18E are formed that face toward the shielding conductor 12A. The capacitor electrodes 18A, 18B, 18D, and 18E are formed in the same layer. Stated otherwise, the capacitor electrodes 18A, 18B, 18D, and 18E are formed on the same ceramic sheet (not shown). Hereinafter, when the individual capacitor electrodes 18A, 18B, 18D, and 18E are described without distinguishing therebetween, the reference numeral 18 will be used.

As shown in FIG. 23, the capacitor electrodes 18 are formed in point symmetry, with the center C of the dielectric substrate 14 as viewed in plan serving as the center of symmetry. The capacitor electrode 18A and the capacitor electrode 18E are formed in point symmetry, with the center C of the dielectric substrate 14 as viewed in plan serving as the center of symmetry. The capacitor electrode 18B and the capacitor electrode 18D are formed in point symmetry, with the center C of the dielectric substrate 14 as viewed in plan serving as the center of symmetry. In the present embodiment, the feature in which the capacitor electrodes 18 are formed in point symmetry is in order to obtain satisfactory frequency characteristics.

The capacitor electrode 18A is connected to the via electrode portion 20A. The capacitor electrode 18B includes partial patterns (electrode patterns) 18B1 to 18B3. The partial pattern 18B1 is connected to a via electrode portion 20B. The partial pattern 18B2 projects out in the −X direction. The partial pattern 18B3 projects out in the +X direction. The capacitor electrode 18D includes partial patterns (electrode patterns) 18D1 to 18D3. The partial pattern 18D1 is connected to the via electrode portion 20D. The partial pattern 18D2 projects out in the +X direction. The partial pattern 18D3 projects out in the −X direction. The capacitor electrode 18E is connected to a via electrode portion 20E.

Further formed inside the dielectric substrate 14 are electrode patterns 18*a* and 18*d* connected to the shielding conductor 12Ca, and electrode patterns 18*b* and 18*c* connected to the shielding conductor 12Cb. The electrode pattern 18*a* is positioned in the −Y direction with respect to the capacitor electrode 18A. The electrode pattern 18*b* is positioned in the +Y direction with respect to the capacitor electrode 18E. The electrode pattern 18*c* is positioned in the +Y direction with respect to the capacitor electrode 18B. The electrode pattern 18*d* is positioned in the −Y direction with respect to the capacitor electrode 18D.

The via electrodes 24 that make up each of the via electrode portions 20A, 20B, 20D, and 20E, in the same manner as in the first embodiment, are arranged along an imaginary circle 26 as viewed in plan.

As shown in FIG. 22 and FIG. 24, coupling capacitance electrodes (plate electrodes) 86A to 86D are formed within the dielectric substrate 14. The coupling capacitance electrodes 86A to 86D are formed in the same layer. Stated otherwise, the coupling capacitance electrodes 86A to 86D are formed on the same ceramic sheet (not shown). The layer in which the coupling capacitance electrodes 86A to 86D are formed is positioned upwardly with respect to the layer in which the capacitor electrodes 18 are formed. One or more non-illustrated ceramic sheets exist between the coupling capacitance electrodes 86 and the capacitor electrodes 18. The coupling capacitance electrode 86A is connected to the via electrode portion 20A provided in the resonator 11A. Stated otherwise, the coupling capacitance electrode 86A is connected to the via electrode portion 20A that is connected to the capacitor electrode 18A. The coupling capacitance electrode 86B is connected to the via electrode portion 20E provided in the resonator 11E. Stated otherwise, the coupling capacitance electrode 86B is connected to the via electrode portion 20E that is connected to the capacitor electrode 18E. The coupling capacitance electrode 86C is connected to the via electrode portion 20B provided in the resonator 11B. The coupling capacitance electrode 86D is connected to the via electrode portion 20D provided in the resonator 11D. Hereinafter, when the individual coupling capacitance electrodes 86A to 86D are described without distinguishing therebetween, the reference numeral 86 will be used.

As shown in FIG. 24, the coupling capacitance electrodes 86 are formed in point symmetry, with the center C of the dielectric substrate 14 as viewed in plan serving as the center of symmetry. The coupling capacitance electrode 86A and the coupling capacitance electrode 86B are formed in point symmetry, with the center C of the dielectric substrate 14 as viewed in plan serving as the center of symmetry. The coupling capacitance electrode 86C and the coupling capacitance electrode 86D are formed in point symmetry, with the center C of the dielectric substrate 14 as viewed in plan serving as the center of symmetry. In the present embodiment, the feature in which the coupling capacitance electrodes 86 are formed in point symmetry is in order to obtain satisfactory frequency characteristics.

The coupling capacitance electrode 86A includes partial patterns (electrode patterns) 86A1 and 86A3. The partial pattern 86A1 is connected to the via electrode portion 20A. One end of the partial pattern 86A2 is connected to the partial pattern 86A1. The partial pattern 86A2 projects out in the +X direction. One end of the partial pattern 86A3 is connected to the partial pattern 86A1. The partial pattern 86A3 projects out in the +Y direction. A part of the partial pattern 86A3 faces toward a part of the partial pattern 18B2 (refer to FIG. 23).

The coupling capacitance electrode 86B includes partial patterns (electrode patterns) 86B1 to 86B3. The partial pattern 86B1 is connected to the via electrode portion 20E. One end of the partial pattern 86B2 is connected to the partial pattern 86B1. The partial pattern 86B2 projects out in the −X direction. One end of the partial pattern 86B3 is connected to the partial pattern 86B1. The partial pattern 86B3 projects out in the −Y direction. A part of the partial pattern 8683 faces toward a part of the partial pattern 18D2 (refer to FIG. 23).

As shown in FIG. 24, a capacitor electrode (strip line) 19C is formed within the dielectric substrate 14. The capacitor electrode 19C is formed in the same layer as the coupling capacitance electrodes 86. Stated otherwise, the capacitor electrode 19C and the coupling capacitance electrodes 86 are formed on the same ceramic sheet (not shown). The layer in which the capacitor electrode 19C is formed is positioned upwardly with respect to the layer in which the capacitor electrodes 18 are formed. The capacitor electrode 19C is formed in point symmetry, with the center C of the dielectric substrate 14 as viewed in plan serving as the center of symmetry. In the present embodiment, the feature in which the capacitor electrode 19C is formed in point symmetry is in order to obtain satisfactory frequency characteristics.

The capacitor electrode 19C includes partial patterns (electrode patterns) 19C1 to 19C3. The partial pattern 19C1 is positioned at the center C of the dielectric substrate 14 as viewed in plan. The partial pattern 19C1 includes partial patterns 19C1*a* to 19C1*c*. The partial pattern 19C1*a* is formed at a position in the −Y direction with respect to the partial pattern 19C1*c*. One end (a lower end) of a partial electrode portion 20Ca is connected to the partial pattern 19C1*a*. The partial pattern 19C1*b* is formed at a position in the +Y direction with respect to the partial pattern 19C1*c*. One end (a lower end) of a partial electrode portion 20Cb is connected to the partial pattern 19C1*b*. Similar to the first embodiment, the partial patterns 19C2 and 19C3 are connected to the partial pattern 19C1. The partial pattern 19C2 projects out in the +Y direction from the partial pattern 19C1*b*. The partial pattern 19C3 projects out in the −Y direction from the partial pattern 19C1*a*.

The plurality of via electrodes 24 constituting the partial electrode portion 20Ca are arranged along an imaginary arc 27A constituting a part of the imaginary circle 26 as viewed in plan (refer to FIG. 32 and FIG. 33). The plurality of via electrodes 24 constituting the partial electrode portion 20Cb are arranged along an imaginary arc 27B constituting a part of the imaginary circle 26 as viewed in plan (refer to FIG. 32 and FIG. 33).

In the present embodiment, the partial electrode portion 20Ca and the partial electrode portion 20Cb are largely spaced apart from each other in the Y direction. Therefore, in the present embodiment, the distance between the partial electrode portion 20Ca and the shielding conductor 12Ca becomes sufficiently short, and together therewith, the distance between the partial electrode portion 20Cb and the shielding conductor 12Cb also becomes sufficiently short. When the distance between the partial electrode portion 20Ca and the shielding conductor 12Ca becomes sufficiently short, the coupling capacitance between the partial electrode portion 20Ca and the shielding conductor 12Ca sufficiently increases. When the distance between the partial electrode portion 20Cb and the shielding conductor 12Cb becomes sufficiently short, the coupling capacitance between the partial electrode portion 20Cb and the shielding conductor 12Cb sufficiently increases. Upon doing so, even in the case that the length of the via electrode portion 20C has become shorter accompanying a reduction in height, it is possible for sufficiently satisfactory electrical characteristics to be obtained.

Further formed inside the dielectric substrate 14 are the electrode patterns 19*a* and 19*d* connected to the shielding conductor 12Ca, and the electrode patterns 19*b* and 19*c* connected to the shielding conductor 12Cb.

As shown in FIG. 23, the coupling capacitance electrodes (plate electrodes) 98A and 98B are formed within the dielectric substrate 14. The coupling capacitance electrode 98A and the coupling capacitance electrode 98B are formed in point symmetry, with the center C of the dielectric substrate 14 as viewed in plan serving as the center of symmetry. In the following description, when the individual coupling capacitance electrodes 98A and 98B are described without distinguishing therebetween, the reference numeral 98 will be used, and when the individual coupling capacitance electrodes 98A and 98B are described while distinguishing therebetween, the reference numerals 98A and 98B will be used.

The coupling capacitance electrodes 98 and the capacitor electrodes 18A, 18B, 18D, and 18E are formed in the same layer. Stated otherwise, the coupling capacitance electrodes 98A and 98B and the capacitor electrodes 18A, 18B, 18D, and 18E are formed on the same ceramic sheet (not shown). The layer in which the coupling capacitance electrodes 98 are formed is positioned between the layer in which the coupling capacitance electrode 86 is formed and the layer in which the shielding conductor 12A is formed. More specifically, the layer in which the coupling capacitance electrodes 98 are formed is positioned between the layer in which the capacitor electrode 19C is formed and the layer in which the shielding conductor 12A is formed. The coupling capacitance electrodes 98 face toward the shielding conductor 12A. The coupling capacitance electrodes 98 are not connected to any of the plurality of resonators 11. The coupling capacitance electrodes 98 are formed in point symmetry, with the center C of the dielectric substrate 14 as viewed in plan serving as the center of symmetry.

The longitudinal direction of the coupling capacitance electrode 98A is the X direction. The coupling capacitance electrode 98A is positioned between the capacitor electrode 18A and the capacitor electrode 18B. A part of the coupling capacitance electrode 98A faces toward a part of the partial pattern 86A1 (refer to FIG. 24). The part of the coupling capacitance electrode 98A and the part of the partial pattern 86A1 overlap with each other as viewed in plan. Another part of the coupling capacitance electrode 98A faces toward a part of the partial pattern 19C1 (refer to FIG. 24). The other part of the coupling capacitance electrode 98A and the part of the partial pattern 19C1 overlap with each other as viewed in plan. As shown in FIG. 22, a capacitive coupling structure 99A2 is constituted by the coupling capacitance electrode 98A, the coupling capacitance electrode 86A, and the capacitor electrode 19C.

As shown in FIG. 23, the longitudinal direction of the coupling capacitance electrode 98B is the X direction. The coupling capacitance electrode 98B is positioned between the capacitor electrode 18D and the capacitor electrode 18E. A part of the coupling capacitance electrode 98B faces toward a part of the partial pattern 86B1 (refer to FIG. 24). The part of the coupling capacitance electrode 98B and the part of the partial pattern 86B1 overlap with each other as viewed in plan. Another part of the coupling capacitance electrode 98B faces toward a part of the partial pattern 19C1 (refer to FIG. 24). The other part of the coupling capacitance electrode 98B and the part of the partial pattern 19C1 overlap with each other as viewed in plan. As shown in FIG. 22, a capacitive coupling structure 99B2 is constituted by the coupling capacitance electrode 98B, the coupling capacitance electrode 86B, and the capacitor electrode 19C.

In the present embodiment as well, in the case that the dimension of the capacitor electrodes 18 increases, the dimension of the coupling capacitance electrodes 98 also increases. Therefore, in the case that the capacitance between the capacitor electrodes 18 and the shielding conductor 12A has increased due to an increase in the dimension of the capacitor electrodes 18, the coupling capacitance between the capacitor electrodes 19C and the coupling capacitance electrodes 98, and the coupling capacitance between the partial pattern 86A1 and the coupling capacitance electrodes 98 also increases due to an increase in the dimension of the coupling capacitance electrodes 98. More specifically, in the present embodiment as well, in the case that the capacitance between the capacitor electrodes 18 and the shielding conductor 12A increases, not only the capacitance between the capacitor electrodes 18 and the shielding conductor 12A, but also the coupling capacitance between the capacitor electrodes 19C and the coupling capacitance electrodes 98, as well as the coupling capacitance between the coupling capacitance electrodes 86 and the coupling capacitance electrodes 98 increases. Therefore, according to the present embodiment, even in the case that a dimensional error or the like occurs when forming the capacitor electrodes 18, a deterioration of the filter characteristics can be suppressed.

As shown in FIG. 25 and FIG. 26, coupling capacitance electrodes (plate electrodes) 88A to 88E are formed within the dielectric substrate 14. The coupling capacitance electrodes 88A to 88E are formed in the same layer. Stated otherwise, the coupling capacitance electrodes 88A to 88E are formed on the same ceramic sheet (not shown). The layer in which the coupling capacitance electrodes 88A to 88E are formed is positioned upwardly with respect to the layer in which the capacitor electrode 19C is formed. That is, the layer in which the coupling capacitance electrodes 88A to 88E are formed is positioned upwardly with respect to the layer in which the coupling capacitance electrodes 86 are formed. One or more non-illustrated ceramic sheets exist between the coupling capacitance electrodes 88 and the capacitor electrode 19C. More specifically, one or more non-illustrated ceramic sheets exist between the coupling capacitance electrodes 88 and the coupling capacitance electrodes 86. The coupling capacitance electrode 88A is connected to the via electrode portion 20A provided in the resonator 11A. The coupling capacitance electrode 88B is connected to the via electrode portion 20E provided in the resonator 11E. The coupling capacitance electrode 88C is connected to the via electrode portion 20B provided in the resonator 11B. The coupling capacitance electrode 88D is connected to the via electrode portion 20D provided in the resonator 11D. The coupling capacitance electrode 88E is connected to the via electrode portion 20C provided in the resonator 11C. Hereinafter, when the individual coupling capacitance electrodes 88A to 88E are described without distinguishing therebetween, the reference numeral 88 will be used.

The coupling capacitance electrodes 88 are formed in point symmetry, with the center C of the dielectric substrate 14 as viewed in plan serving as the center of symmetry. The coupling capacitance electrode 88A and the coupling capacitance electrode 88B are formed in point symmetry, with the center C of the dielectric substrate 14 as viewed in plan serving as the center of symmetry. The coupling capacitance electrode 88C and the coupling capacitance electrode 88D are formed in point symmetry, with the center C of the dielectric substrate 14 as viewed in plan serving as the center of symmetry. The coupling capacitance electrode 88E is also formed in point symmetry, with the center C of the dielectric substrate 14 as viewed in plan serving as the center of symmetry. In the present embodiment, the feature in which the coupling capacitance electrodes 88 are formed in point symmetry is in order to obtain satisfactory frequency characteristics.

The coupling capacitance electrode 88C includes partial patterns (electrode patterns) 88C1 to 88C4. The partial pattern 88C1 is connected to the via electrode portion 20B. One end of the partial pattern 88C2 is connected to the partial pattern 88C1. The partial pattern 88C2 projects out in the −X direction. One end of the partial pattern 88C3 is connected to the partial pattern 88C1. The partial pattern 88C3 projects out in the +X direction. One end of the partial pattern 88C4 is connected to the partial pattern 88C1. The partial pattern 88C4 projects out in the −X direction. The partial pattern 88C4 is formed at a position that is shifted in the +Y direction from the partial pattern 88C2. The partial pattern 88C4 and the partial pattern 88C2 are spaced apart from each other in the Y direction.

The coupling capacitance electrode 88D includes partial patterns (electrode patterns) 88D1 to 88D4. The partial pattern 88D1 is connected to the via electrode portion 20D. One end of the partial pattern 88D2 is connected to the partial pattern 88D1. The partial pattern 88D2 projects out in the +X direction. One end of the partial pattern 88D3 is connected to the partial pattern 88D1. The partial pattern 88D3 projects out in the −X direction. One end of the partial pattern 88D4 is connected to the partial pattern 88D1. The partial pattern 88D4 projects out in the +X direction. The partial pattern 88D4 is formed at a position that is shifted in the −Y direction from the partial pattern 88D2. The partial pattern 88D4 and the partial pattern 88D2 are spaced apart from each other in the Y direction.

The coupling capacitance electrode 88E includes partial patterns (electrode patterns) 88E1 to 88E6. The partial pattern 88E1 is connected to the partial electrode portion 20Cb. One end of the partial pattern 88E1 is connected to the partial pattern 88E2. The partial pattern 88E2 projects out in the +X direction. One end of the partial pattern 88E2 is connected to the partial pattern 88E3. The partial pattern 88E3 projects out in the +Y direction. The partial pattern 88E4 is connected to the partial electrode portion 20Ca. One end of the partial pattern 88E4 is connected to the partial pattern 88E5. The partial pattern 88E5 projects out in the −X direction. One end of the partial pattern 88E5 is connected to the partial pattern 88E6. The partial pattern 88E6 projects out in the −Y direction.

As shown in FIG. 27 and FIG. 28, coupling capacitance electrodes (plate electrodes) 92A to 92E are formed within the dielectric substrate 14. The coupling capacitance electrodes 92A to 92E are formed in the same layer. Stated otherwise, the coupling capacitance electrodes 92A to 92E are formed on the same ceramic sheet (not shown). The layer in which the coupling capacitance electrodes 92A to 92E are formed is positioned upwardly with respect to the layer in which the coupling capacitance electrodes 88 are formed. One or more non-illustrated ceramic sheets exist between the coupling capacitance electrodes 92A to 92E and the coupling capacitance electrodes 88. The coupling capacitance electrode 92A is connected to the via electrode portion 20A provided in the resonator 11A. The coupling capacitance electrode 92B is connected to the via electrode portion 20E provided in the resonator 11E. The coupling capacitance electrode 92C is connected to the via electrode portion 20B provided in the resonator 11B. The coupling capacitance electrode 92D is connected to the via electrode portion 20D provided in the resonator 11D. The coupling capacitance electrode 92E is connected to the via electrode portion 20C provided in the resonator 11C. Hereinafter, when the individual coupling capacitance electrodes 92A to 92E are described without distinguishing therebetween, the reference numeral 92 will be used.

The coupling capacitance electrodes 92 are formed in point symmetry, with the center C of the dielectric substrate 14 as viewed in plan serving as the center of symmetry. The coupling capacitance electrode 92A and the coupling capacitance electrode 92B are formed in point symmetry, with the center C of the dielectric substrate 14 as viewed in plan serving as the center of symmetry. The coupling capacitance electrode 92C and the coupling capacitance electrode 92D are formed in point symmetry, with the center C of the dielectric substrate 14 as viewed in plan serving as the center of symmetry. The coupling capacitance electrode 92E is formed in point symmetry, with the center C of the dielectric substrate 14 as viewed in plan serving as the center of symmetry. In the present embodiment, the feature in which the coupling capacitance electrodes 92 are formed in point symmetry is in order to obtain satisfactory frequency characteristics.

As shown in FIG. 29 and FIG. 30, coupling capacitance electrodes (plate electrodes) 94A to 94D are formed within the dielectric substrate 14. The coupling capacitance electrodes 94A to 94D are formed in the same layer. Stated otherwise, the coupling capacitance electrodes 94A to 94D are formed on the same ceramic sheet (not shown). The layer in which the coupling capacitance electrodes 94A to 94D are formed is positioned upwardly with respect to the layer in which the coupling capacitance electrodes 92 are formed.

One or more non-illustrated ceramic sheets exist between the coupling capacitance electrodes 94A to 94D and the coupling capacitance electrodes 92. The coupling capacitance electrode 94A is connected to the via electrode portion 20A provided in the resonator 11A. The coupling capacitance electrode 94B is connected to the via electrode portion 20E provided in the resonator 11E. The coupling capacitance electrodes 94C and 94D are not connected to the via electrode portions 20 of any of the resonators 11. Hereinafter, when the individual coupling capacitance electrodes 94A to 94D are described without distinguishing therebetween, the reference numeral 94 will be used.

The coupling capacitance electrodes 94 are formed in point symmetry, with the center C of the dielectric substrate 14 as viewed in plan serving as the center of symmetry. The coupling capacitance electrode 94A and the coupling capacitance electrode 94B are formed in point symmetry, with the center C of the dielectric substrate 14 as viewed in plan serving as the center of symmetry. The coupling capacitance electrode 94C and the coupling capacitance electrode 94D are formed in point symmetry, with the center C of the dielectric substrate 14 as viewed in plan serving as the center of symmetry. In the present embodiment, the feature in which the coupling capacitance electrodes 94 are formed in point symmetry is in order to obtain satisfactory frequency characteristics.

As shown in FIG. 32, within the dielectric substrate 14, similar to the first embodiment, the input/output patterns 80A and 80B are formed therein. The input/output patterns 80A and 80B are formed mutually in the same layer. Stated otherwise, the input/output patterns 80A and 80B are formed on the same ceramic sheet (not shown). The layer in which the input/output patterns 80A and 80B are formed is positioned upwardly of the layer in which the coupling capacitance electrodes 94 are formed. One or more non-illustrated ceramic sheets exist between the input/output patterns 80A and 80B and the coupling capacitance electrodes 94. Hereinafter, when the individual input/output patterns 80A and 80B are described without distinguishing therebetween, the reference numeral 80 will be used.

As shown in FIG. 31 and FIG. 33, a coupling pattern 96 is formed within the dielectric substrate 14. The layer in which the coupling pattern 96 is formed is positioned upwardly of the layer in which the input/output patterns 80 are formed. One or more non-illustrated ceramic sheets exist between the coupling pattern 96 and the input/output patterns 80. The coupling pattern 96 is connected to the via electrode portion 20B that is provided in the resonator 11B, and the via electrode portion 20D that is provided in the resonator 11D.

The coupling pattern 96 is formed in point symmetry, with the center C of the dielectric substrate 14 as viewed in plan serving as the center of symmetry. In the present embodiment, the feature in which the coupling pattern 96 is formed in point symmetry is in order to obtain satisfactory frequency characteristics.

As shown in FIG. 18, the shielding via electrode portions 81C and 81D are formed in the dielectric substrate 14. When the individual shielding via electrode portions are described without distinguishing therebetween, the reference numeral 81 will be used, and when the shielding via electrode portions are described while distinguishing therebetween, the reference numerals 81C and 81D will be used.

Ends of the shielding via electrode portions 81 are connected to the shielding conductor 12A. Other ends of the shielding via electrode portions 81 are connected to the shielding conductor 12B. The shielding via electrode portion 81C is also connected to the electrode pattern 18*c*. The shielding via electrode portion 81C is also connected to the electrode pattern 19*c*. The shielding via electrode portion 81D is also connected to the electrode pattern 18*d*. The shielding via electrode portion 81D is also connected to the electrode pattern 19*d*.

One or more of the shielding via electrodes 82 are provided on the shielding via electrode portions 81. According to the present embodiment, two of the shielding via electrodes 82 are provided in one of the shielding via electrode portions 81. That is, shielding via electrodes 82C and 82E are provided on the shielding via electrode portion 81C. Shielding via electrodes 82D and 82F are provided on the shielding via electrode portion 81D.

According to the present embodiment, since the coupling capacitance electrodes 98, which are printed together with the capacitor electrodes 18, are provided between the capacitor electrodes 19 and the shielding conductor 12A, in the case that the dimension of the capacitor electrodes 18 is increased, the dimension of the coupling capacitance electrodes 98 positioned between the capacitor electrodes 19 and the shielding conductor 12A also increases in a similar manner. Therefore, in the case that the capacitance between the capacitor electrodes 18 and the shielding conductor 12A has increased due to an increase in the dimension of the capacitor electrodes 18, the coupling capacitance between the capacitor electrodes 19 and the coupling capacitance electrodes 98 also increases due to an increase in the dimension of the coupling capacitance electrodes 98. More specifically, according to the present embodiment, in the case that the capacitance between the capacitor electrodes 18 and the shielding conductor 12A increases, not only the capacitance between the capacitor electrodes 18 and the shielding conductor 12A, but also the coupling capacitance between the capacitor electrodes 19 and the coupling capacitance electrodes 98 increases. Therefore, according to the present embodiment, even in the case that a dimensional error or the like occurs when forming the capacitor electrodes 18, a deterioration of the filter characteristics can be suppressed.

A description will be given below concerning the inventions that are capable of being grasped from the above-described embodiments.

The filter (10) includes the dielectric substrate (14) including the first main surface (14*b*), and the second main surface (14*a*) positioned on the opposite side of the first main surface, the first shielding conductor (12A) formed on the first main surface side in the dielectric substrate, the second shielding conductor (12B) formed on the second main surface side in the dielectric substrate, the plurality of resonators (11) each of which is equipped with the via electrode portion (20) formed between the first shielding conductor and the second shielding conductor, and the capacitor electrode (18, 19) connected to the one end of the via electrode portion, and the first coupling capacitance electrode (98) that is not connected to any one of the plurality of resonators, and that is configured to face toward the first shielding conductor, wherein the first coupling capacitance electrode is formed in the layer in which the first capacitor electrode (18B) from among the plurality of capacitor electrodes is formed, the layer in which the first capacitor electrode is formed is positioned between the layer in which the second capacitor electrode (19C) from among the plurality of capacitor electrodes is formed, and the layer in which the first shielding conductor is formed, and the part of the first coupling capacitance electrode is positioned between the second capacitor electrode and the first shielding conductor. In accordance with such a configuration, even in the case that a dimensional error or the like occurs when forming the capacitor electrodes, a deterioration of the filter characteristics can be suppressed.

In the above-described filter, the other part of the first coupling capacitance electrode may be positioned between the third capacitor electrode (19A), which is the capacitor electrode formed in the same layer as the second capacitor electrode, and the first shielding conductor.

In the above-described filter, the other part of the first coupling capacitance electrode may be positioned between the second coupling capacitance electrode (86A), which is formed in the same layer as the second capacitor electrode, and the first shielding conductor, and the second coupling capacitance electrode may be connected to the via electrode portion that is connected to the third capacitor electrode (18A), which is the capacitor electrode formed in the same layer as the first capacitor electrode.

In the above-described filter, the other end of each of the plurality of via electrode portions may be connected to the second shielding conductor.

Moreover, the present invention is not necessarily limited to the above-described features, and various configurations can be adopted therein without departing from the essence and gist of the present invention.

The invention claimed is:

1. A filter comprising:

a dielectric substrate including a first main surface, and a second main surface positioned on an opposite side of the first main surface;

a first shielding conductor formed on a first main surface side in the dielectric substrate;

a second shielding conductor formed on a second main surface side in the dielectric substrate;

a plurality of resonators each of which is equipped with a via electrode portion formed between the first shielding conductor and the second shielding conductor, and a capacitor electrode connected to one end of the via electrode portion; and a first coupling capacitance electrode that is not connected to any one of the plurality of resonators, and that is configured to face toward the first shielding conductor;

wherein the first coupling capacitance electrode is formed in a layer in which a first capacitor electrode from among the plurality of capacitor electrodes is formed;

a layer in which the first capacitor electrode is formed is positioned between a layer in which a second capacitor electrode from among the plurality of capacitor electrodes is formed, and a layer in which the first shielding conductor is formed; and a part of the first coupling capacitance electrode is positioned between the second capacitor electrode and the first shielding conductor.

2. The filter according to claim 1, wherein another part of the first coupling capacitance electrode is positioned between a third capacitor electrode, which is a capacitor electrode formed in the same layer as the second capacitor electrode, and the first shielding conductor.

3. The filter according to claim 1, wherein:

another part of the first coupling capacitance electrode is positioned between a second coupling capacitance electrode, which is formed in the same layer as the second capacitor electrode, and the first shielding conductor; and the second coupling capacitance electrode is connected to the via electrode portion that is connected to a third capacitor electrode, which is the capacitor electrode formed in the same layer as the first capacitor electrode.

4. The filter according to claim 1, wherein another end of each of the plurality of via electrode portions is connected to the second shielding conductor.

* * * * *